US012682661B2

(12) United States Patent
Ren et al.

(10) Patent No.: US 12,682,661 B2
(45) Date of Patent: Jul. 14, 2026

(54) SENSOR CALIBRATION USING FIDUCIAL MARKERS FOR IN-CABIN MONITORING SYSTEMS AND APPLICATIONS

(71) Applicant: NVIDIA Corporation, Santa Clara, CA (US)

(72) Inventors: Yuzhuo Ren, Sunnyvale, CA (US); Hairong Jiang, Campbell, CA (US); Niranjan Avadhanam, Saratoga, CA (US); Varsha Chandrashekhar Hedau, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 255 days.

(21) Appl. No.: 17/935,465

(22) Filed: Sep. 26, 2022

(65) Prior Publication Data

US 2024/0104941 A1     Mar. 28, 2024

(51) Int. Cl.
*G06V 20/59*     (2022.01)
*G06F 3/01*     (2006.01)
(Continued)

(52) U.S. Cl.
CPC .............. *G06V 20/59* (2022.01); *G06F 3/013* (2013.01); *G06T 3/20* (2013.01); *G06T 3/60* (2013.01);
(Continued)

(58) Field of Classification Search
None
See application file for complete search history.

(56) References Cited

U.S. PATENT DOCUMENTS 10,885,698 B2    1/2021  Muthler et al.
11,144,754 B2    10/2021 Hu et al.
(Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

(Continued)

*Primary Examiner* — Samuel D Fereja
(74) *Attorney, Agent, or Firm* — SHOOK, HARDY & BACON L.L.P.

(57) ABSTRACT
In various examples, sensor parameter calibration techniques for in-cabin monitoring systems and applications are presented. An occupant monitoring system (OMS) is an example of a system that may be used within a vehicle or machine cabin to perform real-time assessments of driver and occupant presence, gaze, alertness, and/or other conditions. In some embodiments, a calibration parameter for an interior image sensor is determined so that the coordinates of features detected in 2D captured images may be referenced to an in-cabin 3D coordinate system. In some embodiments, a processing unit may detect fiducial points using an image of an interior space captured by a sensor, determine a 2D image coordinate for a fiducial point using the image, determine a 3D coordinate for the fiducial point, determine a calibration parameter comprising a rotation-translation transform from the 2D image coordinate and the 3D coordinate, and configure an operation based on the calibration parameter.

22 Claims, 13 Drawing Sheets

(51) Int. Cl.

| | |
|---|---|
| *G06T 3/20* | (2006.01) |
| *G06T 3/60* | (2024.01) |
| *G06T 7/70* | (2017.01) |
| *G06T 7/80* | (2017.01) |
| *G06V 10/82* | (2022.01) |

(52) U.S. Cl.
CPC .................. *G06T 7/70* (2017.01); *G06T 7/80* (2017.01); *G06V 10/82* (2022.01); *G06T 2207/30204* (2013.01); *G06T 2207/30268* (2013.01)

(56) References Cited

U.S. PATENT DOCUMENTS

| | | | |
|---|---|---|---|
| 2021/0056306 A1 | 2/2021 | Hu et al. | |
| 2021/0082148 A1 | 3/2021 | Parkison et al. | |
| 2021/0190922 A1 | 6/2021 | Yu et al. | |
| 2022/0019086 A1* | 1/2022 | Yao | G02B 27/0172 |
| 2023/0025152 A1* | 1/2023 | Shrivastava | G06N 3/084 |
| 2023/0264702 A1* | 8/2023 | Chang | G01S 13/42 |
| | | | 702/150 |
| 2023/0399015 A1* | 12/2023 | Kothari | G06V 10/14 |

OTHER PUBLICATIONS

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
Domhof, J., et al., "An Extrinsic Calibration Tool for Radar, Camera and Lidar", International Conference on Robotics and Automation (ICRA), pp. 7 (2019).
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).
Non-Final Office Action received for U.S. Appl. No. 17/935,473, mailed on Jan. 28, 2025, 26 pages.

* cited by examiner

400

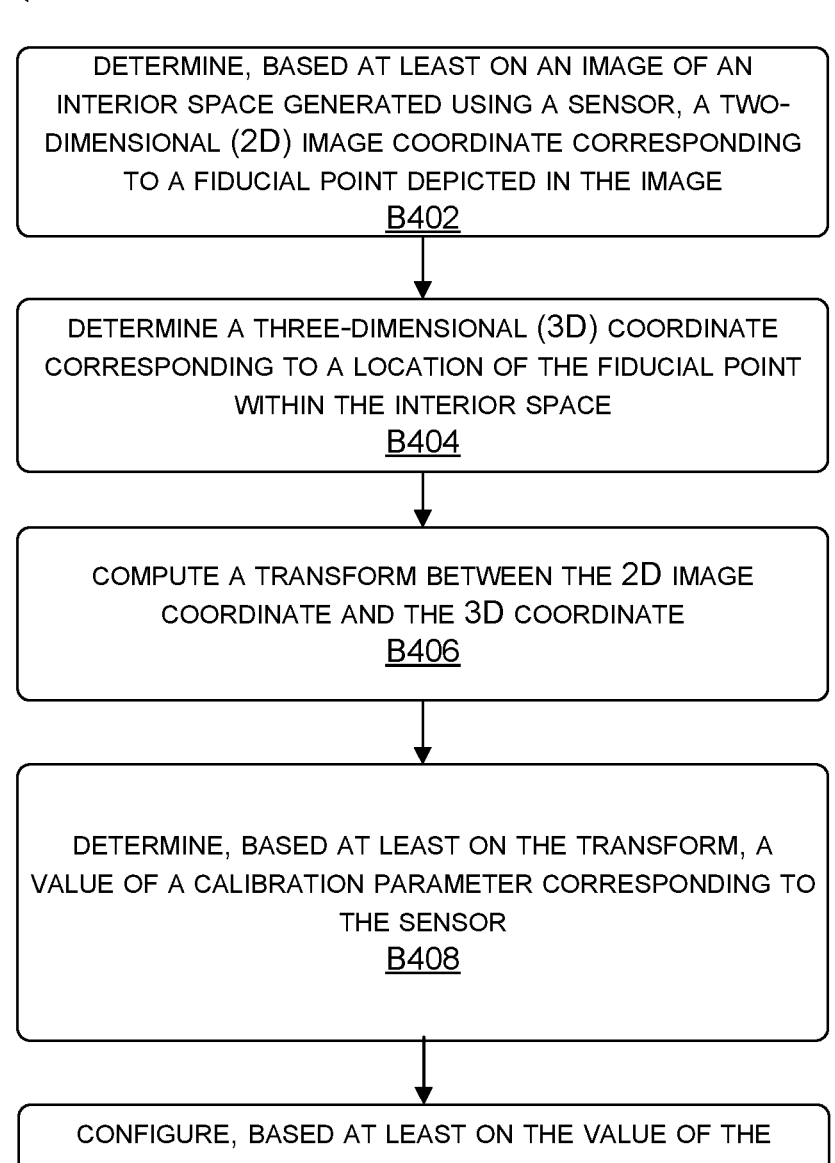

DETERMINE, BASED AT LEAST ON AN IMAGE OF AN INTERIOR SPACE GENERATED USING A SENSOR, A TWO-DIMENSIONAL (2D) IMAGE COORDINATE CORRESPONDING TO A FIDUCIAL POINT DEPICTED IN THE IMAGE
B402

DETERMINE A THREE-DIMENSIONAL (3D) COORDINATE CORRESPONDING TO A LOCATION OF THE FIDUCIAL POINT WITHIN THE INTERIOR SPACE
B404

COMPUTE A TRANSFORM BETWEEN THE 2D IMAGE COORDINATE AND THE 3D COORDINATE
B406

DETERMINE, BASED AT LEAST ON THE TRANSFORM, A VALUE OF A CALIBRATION PARAMETER CORRESPONDING TO THE SENSOR
B408

CONFIGURE, BASED AT LEAST ON THE VALUE OF THE CALIBRATION PARAMETER, AN OPERATION CORRESPONDING TO THE SENSOR
B410

DETECT ONE OR MORE FIDUCIAL POINTS USING AN IMAGE OF A GROUND TRUTH DATA COLLECTION TOOL COMPRISING ONE OR MORE DRIVER GAZE TARGETS, THE IMAGE CAPTURED BY A FIRST SENSOR
B702

DETERMINE A TWO-DIMENSIONAL IMAGE COORDINATE FOR A FIDUCIAL POINT OF THE ONE OR MORE FIDUCIAL POINTS USING THE IMAGE
B704

DETERMINE A ROTATION-TRANSLATION TRANSFORM FOR THE GROUND TRUTH DATA COLLECTION TOOL FROM THE TWO-DIMENSIONAL IMAGE COORDINATE FOR THE FIDUCIAL POINT AND A THREE-DIMENSIONAL COORDINATE WITH RESPECT TO THE INTERIOR SPACE FOR THE FIDUCIAL POINT
B706

DETERMINE A SECOND THREE-DIMENSIONAL COORDINATE WITH RESPECT TO THE INTERIOR SPACE FOR A DRIVER GAZE TARGET OF THE ONE OR MORE DRIVER GAZE TARGETS BASED AT LEAST ON A FIRST CALIBRATION PARAMETER FOR THE FIRST SENSOR AND THE ROTATION-TRANSLATION TRANSFORM FOR THE GROUND TRUTH DATA COLLECTION TOOL
B708

SERVER(S) 878

CPU 880(B)

CPU 880(A)

PCIE SWITCH 882(D)

PCIE SWITCH 882(C)

PCIE SWITCH 882(B)

PCIE SWITCH 882(A)

GPU 884(F)

GPU 884(H)

GPU 884(E)

GPU 884(G)

GPU 884(B)

GPU 884(D)

GPU 884(A)

GPU 884(C)

886

888

800

894

892

NETWORK(S) 890

1000

SENSOR CALIBRATION USING FIDUCIAL MARKERS FOR IN-CABIN MONITORING SYSTEMS AND APPLICATIONS

CROSS-REFERENCE TO RELATED APPLICATION

This patent application is related to U.S. patent application Ser. No. 17/935,473, titled "MULTI-MODAL SENSOR CALIBRATION FOR IN-CABIN MONITORING SYSTEMS AND APPLICATIONS" filed on Sep. 26, 2022.

BACKGROUND

Autonomous and semi-autonomous vehicles rely on machine learning approaches—such as those using deep neural networks (DNNs)—to analyze images of the inside of a vehicle or machine cabin. An occupant monitoring system (OMS) is an example of a system that may be used within a vehicle cabin to perform real-time assessments of driver and occupant presence, gaze, alertness, and/or other conditions. For example, OMS sensors (such as, but not limited to, RGB sensors, infrared (IR) sensors, depths sensor, cameras, and/or other optical sensors, for example) may be used to track the direction of an occupant's eye gaze, head pose, and/or blinking (e.g., to detect drowsiness, fatigue, and/or distraction).

SUMMARY

Embodiments of the present disclosure relate to image sensor calibration for in-cabin monitoring systems and applications. Systems and methods are disclosed that may be used for calibrating vehicle or machine occupant monitoring system sensors with respect to a coordinate system of an interior space of a vehicle or other machine type.

In contrast to existing calibration technologies, the systems and methods presented in this disclosure use invariant fiducial points that are integrated with fixed interior surfaces inside of an interior space (e.g., a cabin) of a vehicle or machine. The fiducial points are used to derive a rotation-translation transform for one or more occupant monitoring system sensors that accounts for the pose (e.g., the rotation and translation) of the sensors. Based on a sensor's rotation-translation transform, the coordinates of features detected in two-dimensional (2D) captured images may be referenced with respect to an in-cabin frame of reference coordinate system, which may be referred to herein as the cabin coordinate system. Fiducial points may be implemented as fiducial markers that integrate into the interior roof liner, doors, side panels, windows, and/or other surfaces. In some embodiments, fiducial points are implemented based on fixed interior landmark features that are readily discernable fixed structural elements of the interior space. Using at least the 2D coordinates (e.g., u, v) of fiducial markers in the 2D coordinate space of the captured image frame, and pre-established 3D coordinates (e.g., x, y, z) of the fiducial markers in the cabin coordinate space, a pose computation algorithm may be used to estimate rotation and translation vectors that represent the pose of the sensor that captured the image frame with respect to the cabin coordinate system. The rotation and translation vectors may define a rotation-translation transform that may then be used as a calibration parameter for an occupant monitoring system—that is, a system that performs one or more occupant monitoring functions using the sensor such as, but not limited to, identifying faces, facial landmarks, eye information, gaze detection, occupant position, seat position, and/or other operations. Computation of the rotation-translation transform may be performed as a factory calibration procedure, a calibration procedure initiated by a service technician when the vehicle is brought in for service, and/or automatically triggered while the vehicle remains in service to account for changes in sensor pose due to vehicle vibrations, repositioning of the sensor due to driver initiated adjustments, and/or other reasons. In some embodiments, a calibration accuracy metric associated with calibrated sensors may be computed and periodically tracked.

In another aspect, a calibrated sensor may be used in conjunction with a ground truth data collection tool to generate ground truth gaze data which may be used, for example, to train a machine learning model (e.g., a DNN) to perform operations, such as but not limited to, gaze detection. The ground truth data collection tool may comprise one or more fiducial markers and one or more driver gaze targets. The ground truth data collection tool may be positioned to align at least one fiducial marker with a location of a designated gaze region having known 3D coordinates with respect to the cabin coordinate system. An image of the ground truth data collection tool may be captured by the calibrated sensor, and the fiducial marker(s) may be used to determine a pose of the ground truth data collection tool with respect to the cabin coordinate system. From this determination, the coordinates associated with the one or more driver gaze targets with respect to the cabin coordinate system may be determined. In operation, a test operator may illuminate a gaze target while a calibrated occupant monitoring system sensor captures images of a test occupant (e.g., driver)—such as while seated. The illumination of the first gaze target catches the test occupant's attention as image frames capture the test occupant's eye(s) when their gaze is directed at the illumination of the first gaze target. Because the 3D coordinates of the first gaze target with respect to the cabin coordinate system are known, the captured image frames of the test driver may be labeled with the 3D coordinates of the first gaze target to produce ground truth data corresponding to one or more training images. Additional ground truth data may be generated in the same manner to produce a set of training data by sequentially illuminating other gaze targets while image frames capture the occupant's eyes and gaze.

BRIEF DESCRIPTION OF THE DRAWINGS

Sensor calibration for in-vehicle monitoring systems and applications are described in detail below with reference to the attached drawing figures, wherein:

FIG. 4 is a flow diagram showing a method for sensor parameter calibration, in accordance with some embodiments of the present disclosure;

FIG. 7 is a flow diagram showing a method for generating ground truth gaze data, in accordance with some embodiments of the present disclosure;

DETAILED DESCRIPTION

Figure 1:
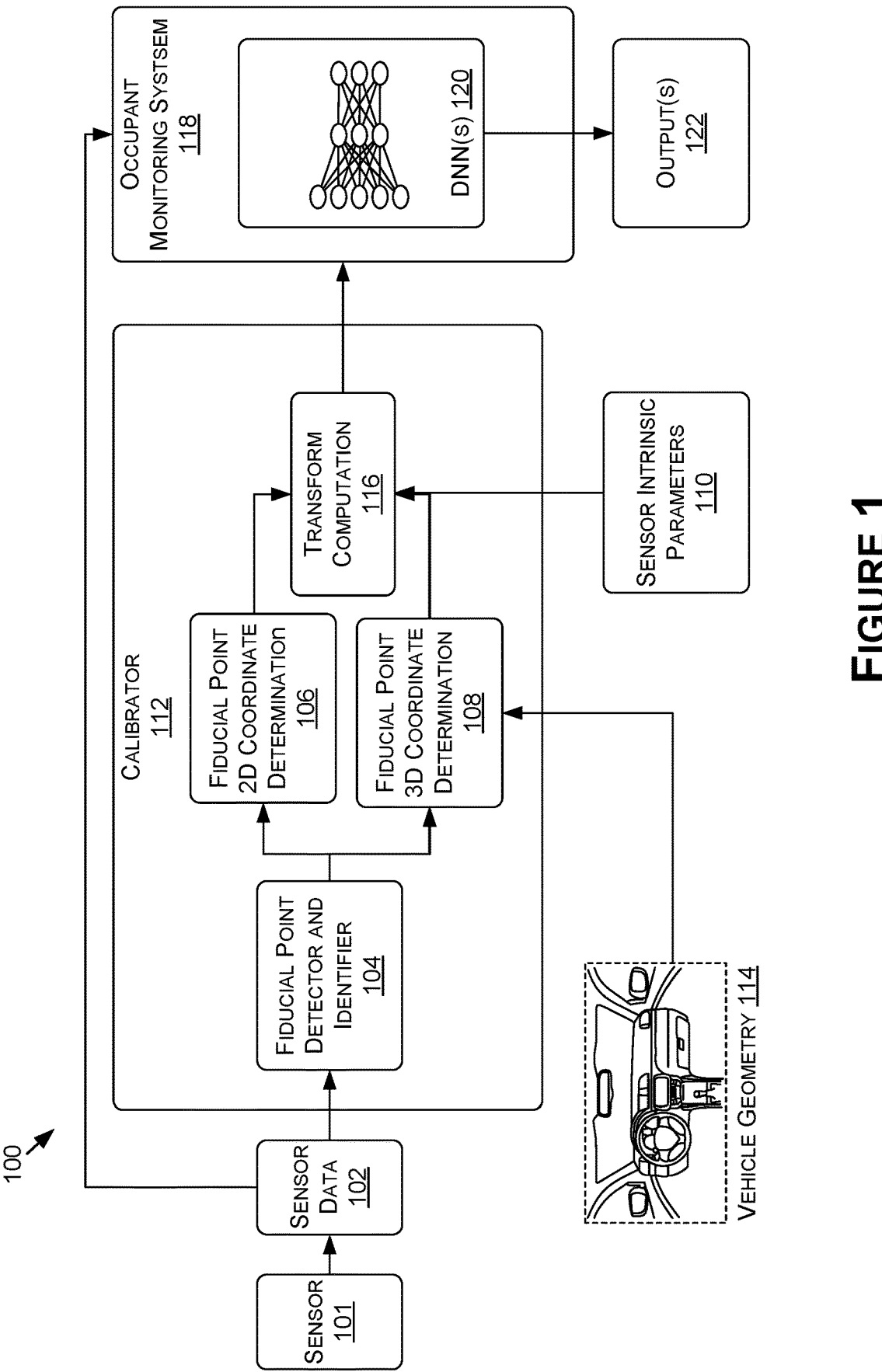
FIG. 1 is an illustration of an example flow diagram for an image sensor extrinsic parameter calibration operating environment, in accordance with some embodiments of the present disclosure.

Systems and methods are disclosed related to sensor parameter calibration for in-cabin monitoring systems and applications. Although the present disclosure may be described with respect to an example autonomous or semi-autonomous vehicle 800 (alternatively referred to herein as "vehicle 800" or "ego-machine 800," an example of which is described with respect to FIGS. 8A-8D), this is not intended to be limiting. For example, the systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to vehicle occupant monitoring systems, this is not intended to be limiting, and the systems and methods described herein may be used in augmented reality, virtual reality, mixed reality, robotics, security and surveillance, autonomous or semi-autonomous machine applications (e.g., for occupant monitoring, driver and/or occupant presence, gaze detection, tracking or estimation), lab environments, indoor environments (e.g., for mapping gaze to locations in a room), industrial environments (e.g., for mapping gaze to locations within a factory or plant), and/or any other technology spaces where sensor calibration and/or occupant monitoring may be used.

The present disclosure relates to sensor calibration and/or ground truth generation for, as an example and without limitation, occupant monitoring technologies. The systems and methods presented in this disclosure provide for calibrating one or more occupant monitoring system (OMS) sensors (such as RGB sensor, Infrared sensor (IR), depth sensor, etc.) with respect to an in-cabin frame of reference coordinate system. Occupant monitoring may be used within a vehicle cabin to perform real-time or near real-time assessments of driver and occupant presence, gaze, alertness, and/or other conditions. For example, OMS sensors may be used to track the direction of a driver's eye gaze, head pose, and/or blinking (e.g., to detect drowsiness, fatigue, and/or distraction), for hand position and/or gesture detection, child and/or pet presence detection, and/or in conjunction with the operation of features such as, but not limited to, seat belt reminders, seat heating and/or smart airbag deployment. However, the extent to which an occupant monitoring system can draw accurate conclusions from OMS sensor data is limited unless features depicted in the images can be accurately represented in the three-dimensional (3D) space of the vehicle or machine cabin and/or other interior space.

Parameters that influence OMS sensor calibration (e.g., with respect to how a three-dimensional (3D) space is captured as a two-dimensional image frame) can include both extrinsic and intrinsic parameters. Extrinsic parameters may refer to factors that describe the physical orientation of the sensor device, such as rotation and translation (also referred to as roll and tilt), and/or other parameters. Intrinsic parameters may refer to factors that describe sensor device optics, such as optical center (also known as the principal point), focal length, skew coefficient, field of view or sensory field, and/or other parameters. The extrinsic and intrinsic parameters of a sensor device both play a part in how features of a scene within the three-dimensional (3D) coordinate space of a vehicle or machine cabin (which may referred to as the cabin coordinate system) are mapped to the two-dimensional (2D) coordinate space of the plane of a sensor captured image frame. While the intrinsic parameters of an OMS sensor can be established during manufacture and can be expected to remain reasonably stable, the extrinsic parameters of rotation and translation can change or fluctuate over time, depending on how the OMS sensor is mounted and oriented within the space of the cabin. Moreover, due to factors such as vehicle vibrations, a sensor's rotation and translation may drift over time.

Prior factory procedures for calibrating OMS cameras involve the use of a calibration pattern board (e.g., a chessboard pattern) that is manually placed within the space of the vehicle cabin in different positions and poses. Computation of camera rotation and translation parameters is then performed based on evaluating a series of images of the calibration board in the different positions and poses as captured by the camera. However, the accuracy of such techniques is highly sensitive to the precise placement of the calibration pattern boards, and such techniques are time consuming and labor intensive. Further, such procedures are not, in any reliable sense, performable by consumers after delivery of the vehicle to account for drifting sensor rotation and translation parameters over time.

In contrast to existing OMS sensor calibrating technologies, the systems and methods presented in this disclosure may use a plurality of invariant fiducial points that are defined across fixed interior surfaces inside a vehicle cabin, or other vehicle compartment. For example, the interior surfaces may comprise fiducial points implemented as fiducial point markers integrated into the interior roof liner, doors, side panels, windows, and/or other fixed surfaces, that are within the field of view of the OMS sensor. The fiducial point markers may include visual fiducial system patterns, such as, but not limited to, AprilTag patterns, ARtag patterns, and/or other patterns that facilitate computing 3D position, orientation, and/or identity of the fiducial point markers relative to the OMS sensor. In some embodiments, textures, infrared coloring, and/or other technologies may be used to render fiducial point markers that are not readily discernable to the human eye, but are detectable by the OMS sensor. Fiducial points may also comprise predefined "landmark" interior features within the field of view of the OMS sensor such as handles, seatbelt mount points, interior lighting components, or other discernable elements within the cabin. In both implementations, machine learning algorithms or other technologies may be used to detect and extract fiducial point features from images of the interior space captured by an OMS sensor.

In embodiments, individual OMS sensors may be calibrated to the cabin coordinate system by deriving a rotation-translation (RT) transform that accounts for the rotation and translation of an OMS sensor as-installed, so that the 2D coordinate space of a captured image frame may be mapped to the 3D cabin coordinate system of the vehicle or machine. For example, an image frame capturing a plurality of fiducial points from surfaces within the cabin may be generated from OMS sensor captured sensor data. The invariant 3D cabin coordinates (e.g., x, y, z) associated with each of those fiducial points may be pre-established. For example, 3D cabin coordinates for a fiducial point may be obtained from vehicle manufacturer design specifications, such as coordinates of the fiducial points as indicated by Computer Assisted Drawing (CAD) models, or similar models, used for manufacturing the vehicle. In some embodiments, fiducial points may include an identifier (ID) encoded readable by the OMS sensor. During calibration, the OMS may read the fiducial point ID for a fiducial point using the OMS sensor and obtain from memory the 3D cabin coordinates corresponding to that fiducial point ID. To detect the location of fiducial markers in the 2D coordinate space (e.g., u, v) of the captured image frame, processing of the image frame may be performed using one or more computer vision algorithms and/or machine learning models (e.g., deep neural networks (DNNs)).

For individual fiducial points, a pair of corresponding 2D coordinates (u, v) and 3D coordinates (x, y, z) may be used to define a respective coordinate pair. The set of coordinate pairs that comprises the respective coordinate pair for the fiducial points identified from the captured image frame may then be processed by a pose computation algorithm. In some embodiments, the pose computation algorithm computes an optimized translation-rotation matrix corresponding to the extrinsic pose of the OMS sensor. The OpenCV algorithm solvePnP is one example of a pose computation algorithm that may be used to estimate rotation and translation vectors. These rotation and translation vectors represent a transform between a 3D point expressed in the cabin coordinate frame and a 2D point expressed in the image coordinate frame. For example, in one embodiment, the relationship between an OMS sensor's 2D coordinate space (u, v) and the 3D cabin coordinate space (x, y, z) may be expressed as:

$$s \begin{bmatrix} u \\ v \\ 1 \end{bmatrix} = \begin{bmatrix} f_x & \gamma & u_0 \\ 0 & f_y & v_0 \\ 0 & 0 & 1 \end{bmatrix} [R|T] \begin{bmatrix} x \\ y \\ z \\ 1 \end{bmatrix} = \begin{bmatrix} f_x & \gamma & u_0 \\ 0 & f_y & v_0 \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x \\ y \\ z \\ 1 \end{bmatrix}$$

where the sensor intrinsic parameters $f_x$ and $f_y$ correspond to focal length, $u_0$ and $v_0$ correspond to the sensor principal point, and $\gamma$ corresponds to an optical distortion (e.g., skew) coefficient, and s is a scaling factor. Regarding the sensor extrinsic parameters, these are expressed by the RT matrix wherein the rotation vector (R) comprises the elements $r_{11}$, $r_{21}$, $r_{31}$, $r_{12}$, $r_{22}$, $r_{32}$, $r_{13}$, $r_{23}$, $r_{33}$ of the RT matrix, and translation vector (T) comprises the elements $t_1$, $t_2$, $t_3$ of the RT matrix. In some embodiments, the pose computation algorithm iteratively computes the RT matrix to converge on a set of R and T values that (e.g., optimally, or are optimized to) fit the 2D and 3D coordinates of the set of coordinate pairs of the detected fiducial points. The resulting RT matrix computed by the pose computation algorithm thus represents an estimate of the pose of the OMS sensor with respect to the cabin coordinate system. The computed optimal RT matrix may be saved to memory as an extrinsic calibration parameter corresponding to that OMS sensor. In runtime, the OMS may use the extrinsic calibration parameter for an OMS sensor to translate features appearing in an image frame into the cabin coordinate system for use as further input to other systems, such as driver and occupant assessment functions (e.g., driver and occupant presence, gaze, alertness, and/or other conditions).

In some embodiments, the accuracy of the estimated optimal RT matrix may be determined by re-projecting the known 3D coordinates of one or more fiducial points back onto an image of the fiducial points captured by an OMS sensor. For example, given the known 3D coordinates $(x_1, y_1, z_1)$ of a fiducial point, 2D coordinates $(u_1, v_1)$ for a validation point may be computed as a function of the optimal RT matrix, and projected onto an image of the fiducial point captured by the OMS sensor. The 2D coordinates of the validation point may be compared to the 2D coordinates of the fiducial point as determined directly from the captured image. Any deviation between the coordinates of the validation point and the coordinates of the fiducial point from the captured image may indicate a calibration error in the optimal RT matrix. In some embodiments, calibration errors computed for a plurality of fiducial points from the captured image frame may similarly be determined and an aggregate calibration accuracy metric computed for the optimal RT matrix.

Because a vehicle OMS may comprise a plurality of OMS sensors, a respective optimal RT matrix may be computed using the calibration techniques described herein for each OMS sensor, and the resulting optimal RT matrix stored as a calibration parameter in memory for access by the vehicle OMS or other system. Furthermore, since the pose of each OMS sensors may be computed with respect to the cabin coordinate system, coordinates of image features captured by one OMS sensor may be translated to the 2D coordinates of a different OMS sensors. From the stored calibration parameters, the vehicle or machine OMS know how each OMS sensor is viewing the internal cabin space, and how each OMS sensor is oriented with respect to its rotation and translation extrinsic parameters. Moreover, using the ability to translate between the 2D coordinates of different OMS sensors, the OMS may also generate composite images of the interior from separate images captured by different OMS sensors, with features of those composite images translatable to the cabin coordinate system. For example, composite images generated from multiple OMS sensors may be used to more accurately assess a driver or other occupant's body pose or positions with respect to the cabin coordinate system. In some embodiments, a plurality of OMS sensors viewing the internal cabin space may be treated as an array of sensors, and a bundle adjustment (BA)—or a similar numerical optimization process to compensate for cumulative errors incurred from using multiple sensor views—may be performed by the OMS to adjust an overall optimization among all the OMS sensors.

In another aspect, the calibration accuracy metric associated with the plurality of OMS sensors may be periodically tracked and/or trending metrics computed. The OMS may then respond to adverse metrics that indicate that the OMS sensor pose is changing over time (e.g., as the result of vehicle vibrations). For example, in some embodiments the OMS may respond to adverse metrics by setting a vehicle service flag or activating a warning indication. A service technician (e.g., during a vehicle service) may re-execute the OMS sensor calibration described herein to re-compute an RT matrix for one or more of the vehicle's OMS sensors while the vehicle is in the shop for service.

In some embodiments, the OMS may automatically initiate a runtime OMS sensor calibration. Initiation of the runtime OMS sensor calibration may be triggered based on adverse calibration accuracy metrics and/or trending metrics (e.g., when the metrics exceed a threshold), triggered periodically (e.g., based on time and/or mileage driven), and/or triggered based on other factors. For example, in some embodiments, an OMS sensor may be mounted within a driver adjustable component (e.g., a steering wheel column). When the driver adjusts the height, tilt, or other position adjustment of the component, the RT matrix previously computed for that OMS sensor may no longer be valid. As such, the OMS may detect the position adjustment and automatically initiate a runtime OMS sensor calibration for that repositioned OMS sensor to compute a new or updated RT matrix. In some embodiments, a tolerance for drift in the calibration accuracy metric for a particular OMS sensor may, at least in part, be a based on the functions performed by the particular OMS sensor. For example, a threshold for triggering runtime OMS sensor calibration may be different for an OMS sensor used for occupant gaze detection than an OMS sensor used for seatbelt use detection. In various implementations, the computations for runtime OMS sensor calibration may be executed using on-vehicle computing resources, or in some embodiments, at least in part using one or more cloud based computing resources accessed via a wireless network.

As previously mentioned, assessment of an occupant's eye gaze is an example of an operation that may be implemented by an OMS. Images from OMS sensors that are calibrated to the cabin coordinate system may be used by the OMS to evaluate an occupant's eye gaze to determine what instrument cluster, controls, window, and/or other gaze region of the cabin interior a driver is currently observing. For example, the OMS may be trained to determine a gaze direction from an image frame, project the gaze direction to a gaze point on the cabin interior, and determine a coordinate in the cabin coordinate system corresponding to the gaze point. To generate ground truth gaze data for training an OMS gaze function one or more ground truth data collection tools may be placed in the field of view of one or more OMS sensors that have been calibrated to the cabin coordinate system. In some embodiments, each ground truth data collection tool comprises at least one fiducial point marker, and one or more driver gaze targets (such as an array of light emitting diodes, for example). The ground truth data collection tools may be positioned to align at least one of its fiducial point markers with the location of a designated gaze region having known 3D coordinates with respect to the cabin coordinate system (e.g., from vehicle manufacturer design specifications, such as coordinates indicated by a CAD model). By capturing an image frame of a ground truth data collection tool, 2D coordinates of the fiducial point marker may be determined with respect to the image frame, and a pose of the ground truth data collection tool (e.g., rotation and translation as represented by an RT matrix) with respect to the cabin coordinate system computed. Further, because the relative position of the occupant gaze target on the ground truth data collection tool with respect to the fiducial point marker is known, the 3D coordinate of the gaze targets may be translated to the cabin coordinate system based on the computed rotation and translation of the ground truth data collection tool.

With the positions of the gaze targets calibrated to the cabin coordinate system, ground truth gaze data may be generated by capturing (with a calibrated OMS sensor) images of test driver eye gaze as the gaze targets are selectively activated. For example, during operation a test operator may illuminate a first gaze target on a first of the ground truth data collection tools while a calibrated OMS sensor captures images of a test driver seated in the driver's seat. The illumination of the first gaze target will catch the test driver's attention as image frames capture the test driver's eye as their gaze is directed at the illumination of the first gaze target. Because the 3D coordinates of the first gaze target with respect to the cabin coordinate system is known, those image frames may be labeled (e.g., tagged) with the 3D coordinates of the first gaze target to produce ground truth data corresponding to the training image. Additional ground truth data may be generated in the same manner to produce a set of training data by sequentially illuminating other gaze targets while image frames capture the driver's (or other occupant's) eyes and gaze direction.

Another use case for using image frames from a calibrated OMS sensor is to estimate the position of adjustable features or other moveable objects, such as seat position estimation. For example, a region of the seat, such as a seat back or headrest, may define a fiducial point that is detectable the OMS sensor and used to generate a 2D coordinate in the image space of the OMS sensor, which is translated to the 3D cabin coordinate system using the calibration parameters for that OMS sensor. Seat position can thus be determined based on the 3D coordinates derived using the calibration parameters. In the same way, the position of other objects (e.g., people, pets, packages) can be established from captured 2D image frames.

While embodiments presented in this disclosure may be implemented in the context of vehicle occupant monitoring systems (e.g., driver monitoring systems) for vehicles such as, but not limited to, non-autonomous vehicles, semi-autonomous vehicles, piloted and un-piloted robots or robotic platforms, warehouse vehicles, off-road vehicles, vehicles coupled to one or more trailers, aircraft, spacecraft, boats, shuttles, emergency response vehicles, construction vehicles, underwater craft, drones, and/or other vehicle types, other embodiments other embodiments may include determining extrinsic calibration parameters for sensors that capture image frames of other interior spaces, such as rooms, warehouses, gymnasiums, containers, and/or studio sets, in order to calibrate such sensors to the 3D coordinate system of the interior space.

Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

The various image processing, feature detection, calibration parameter computations and other algorithms disclosed herein may be executed at least in part on one or more graphics processing units (or other parallel processing units) that may operate in conjunction with software executed on a central processing unit coupled to a memory. The graphics processing units may be programmed to execute kernels to implement one or more functions for detecting fiducial points from captured images of the fiducial points, and in some embodiments, computing 2D coordinates of the fiducial points. In some embodiments, the execution of some algorithms may be distributed and performed by a combination of processing units and cloud computing resources.

Further, disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is a data flow diagram illustrating an example process 100 for image sensor parameter calibration, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to, or instead of, those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 800 of FIGS. 8A-8D, example computing device 900 of FIG. 9, and/or example data center 1000 of FIG. 10.

The process 100 may include generating and/or receiving sensor data 102 from one or more sensors 101 of a vehicle 800 (which may be similar to the machine 800, and/or may include non-autonomous or semi-autonomous vehicles). The sensor data 102 may be used by an occupant monitoring system 118 for various occupant monitoring functions such as, but not limited to identifying faces, facial landmarks, eye information, and/or other information of one or more occupants of the vehicle 800, such as identifying an occupant(s) based on facial features and/or detecting gaze of an occupant(s) of the vehicle 800. Based at least in part on the sensor data 102, the occupant monitoring system 118 may generate output(s) 122 using one or more deep neural networks (DNNs) 120. As an example, the occupant monitoring system 118 may use sensor data 102 to predict a gaze location of occupant(s) within a three-dimensional world coordinate system corresponding to the interior of the vehicle 800, wherein other systems of the vehicle 800 may determine one or more actions to take based on the gaze prediction, and/or other tasks or operations. As discussed herein, in order to produce output(s) 122 comprising predictions referenced to the three-dimensional world coordinate system corresponding to the interior space of the vehicle 800 (e.g., the in-cabin coordinate system), the occupant monitoring system 118 is calibrated to account for the intrinsic and extrinsic calibration parameters of the sensor 101 that captures the sensor data 102.

The sensor data 102 may include, without limitation, sensor data 102 from any type of optical sensors (e.g., RGB sensors, Infrared sensors (IR), depth sensors, cameras, or other optical sensors, for example) such as but not limited to those described herein with respect to the vehicle 800 and/or other vehicles or objects—such as robotic devices, VR systems, AR systems, mixed reality systems, etc., in some examples. As a non-limiting example, and with reference to FIGS. 8A-8C, the sensor data 102 may include the data generated by, without limitation, RADAR sensor(s) 860, ultrasonic sensor(s) 862, LIDAR sensor(s) 864, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, in-cabin cameras, in-cabin heat, pressure, or touch sensors, in-cabin motion sensors, and/or other sensor types.

In some embodiments, the sensor data 102 may correspond to sensor data comprising 2D image frames generated using one or more in-cabin sensors 101, such as one or more in-cabin cameras, in-cabin near-infrared (NIR) sensors, in-cabin microphones, and/or the like. The sensor data 102 may correspond to sensors with a sensory field or field of view internal to the vehicle 800 (e.g., cameras with the occupant(s), such as the driver, in its field of view). In some embodiments, the sensor data 102 may also correspond to sensor data generated using one or more external sensors of the vehicle 800, such as one or more cameras, RADAR sensor(s) 860, ultrasonic sensor(s) 862, LIDAR sensor(s) 864, and/or the like. As such, sensor data 102 may also correspond to sensors with a sensory field or field of view at least partially external to the vehicle 800 (e.g., cameras, LiDAR sensors, etc. with sensory fields including the environment exterior to the vehicle 800).

As illustrated in FIG. 1, calibration parameters that may be used by the occupant monitoring system 118 include at least a transform (e.g., a rotation-translation transform) computed for the sensor 101. The rotation-translation transform may be computed by a calibrator 112 and used by the occupant monitoring system 118, or other component of vehicle 800, to map features from 2D image frames to the cabin coordinate system. For example, sensor data 102 may be analyzed by the occupant monitoring system 118 to determine facial landmarks (e.g., eyes, nose, mouth, etc.) that aid in determining an origin of an occupant's gaze. For a non-limiting example, the occupant monitoring system 118 may include one or more deep neural networks (DNN(s)) 120 that may process sensor data 102 corresponding to features such as eyes, face, arms, hands, and/or upper torso of an occupant and map those features to 3D coordinates in the cabin coordinate system using the rotation-translation transform computed by the calibrator 112.

Although examples are described herein with respect to occupant monitoring system 118 using the DNN(s) 120 with respect processing sensor data 102, this is not intended to be limiting. For example and without limitation, the occupant monitoring system 118 may include DNN(s) 120 and/or other computer vision algorithms, image processing algorithms, machine learning models, etc. As an example, the occupant monitoring system 118 may process the sensor data 102 to generate facial features, facial landmarks, gaze origin, gaze locations, gaze vectors, angular offset, and/or other gaze information. Detections may correspond to locations (e.g., in 2D image space, in 3D space, etc.), geometry, pose, semantic information, and/or other information about the detection. As such, for gaze information, eye measurements (e.g., angular offset between visual and optical axes of an eyeball, cornea radius and curvature, distance between pupil center and corneal center, refraction of aqueous humor and cornea) may be detected or calculated by the occupant monitoring system 118 processing the sensor data 102.

The output(s) 122 of the occupant monitoring system 118 and/or DNN(s) 120 may undergo post-processing, in embodiments, such as by converting raw outputs to useful outputs—e.g., where a raw output corresponds to a confidences for each point or pixel that the point or pixel corresponds to a gaze location of a user, post-processing (e.g., filtering, clustering, etc.) may be executed to determine a final point(s) that corresponds to the gaze location of the user. This post-processing may include temporal filtering, weighting, outlier removal (e.g., removing pixels or points determined to be outliers), upscaling (e.g., the outputs may be predicted at a lower resolution than an input sensor data instance, and the output may be upscaled back to the input resolution), downscaling, curve fitting, and/or other post-processing techniques. The output(s) 122—after post-processing, in embodiments—may be in either a 2D coordinate space (e.g., image space, etc.) and/or may be in a 3D coordinate system (e.g., a 3D coordinate system of the vehicle, as defined using vehicle geometry 114, for example).

The output(s) 122 of the occupant monitoring system 118 and/or DNN(s) 120 may include the gaze vectors, angular offsets, values in the three-dimensional world coordinate system of the vehicle, and/or other output types. In some embodiments, the output(s) 122 may include gaze vectors. The gaze vectors may include a magnitude and direction representative of the user's gaze toward a location within the interior of the vehicle. In some embodiments, the gaze vectors may be associated with a gaze origin, a point from which the gaze vector is projected in order to determine a predicted gaze location. In some embodiments, the output(s) 122 may include angular offsets. The angular offsets may represent an offset in angle between two axes with respect to a user (e.g., angle difference between visual and optical axes of the user). In some embodiments, the output(s) 122 may include three-dimensional coordinates. For instance, the output(s) 122 may include a predicted gaze location within a three-dimensional world coordinate system in the vehicle. In some embodiments, the output(s) 122 may include a predicted gaze location within a three-dimensional coordinate system from the perspective of a sensor (e.g., camera). The output(s) 122 may also include other information such as confidence levels with respect to calculated gaze predictions.

The rotation-translation transform corresponding to sensor 101 may be computed by a calibrator 112 that may comprise a fiducial point detector and identifier 104, a fiducial point 2D coordinate determination function 106, a fiducial point 3D coordinate determination function 108, and a transform computation function 116. Input to the calibrator 112 may include, but is not limited to, sensor data 102, sensor intrinsic parameters 110, and vehicle geometry 114. In some embodiments, the calibrator 112 may be functionally integrated as a component of the occupant monitoring system. In some embodiments, the calibrator 112 may compute the rotation-translation transform, and apply the rotation-translation transform as a calibration parameter to the occupant monitoring system 118. The occupant monitoring system 118 may, for example, use the rotation-translation transform to generate updated sensor data (e.g., 3D coordinate data) as an input to the DNN(s) 120 or to operate on one or more layers on the DNN(s) 120.

The fiducial point detector and identifier 104 may analyze the sensor data 102 to detect the presence of one or more fiducial points. The one or more detected fiducial points may be implemented as fiducial markers (alternatively referred to herein as fiducial point markers) integrated into the interior roof liner, doors, seatbelts, side panels, seats, windows, and/or other fixed surfaces, that are within the field of view of the OMS sensor. Fiducial point markers may include visual fiducial system patterns, such as, but not limited to, AprilTag patterns or other patterns that facilitate computing precise 3D position, orientation, and/or identity of the fiducial point markers relative to the sensor 101. In some embodiments, textures, infrared coloring, or other technologies may be used to render fiducial point markers that are invisible to the human eye, but detectable by the sensor 101. Fiducial points may also comprise predefined landmark interior features within the field of view of the sensor 101 such as handles, seatbelt mount points, interior lighting components, or other discernable elements within the cabin. In any implementation, the fiducial point detector and identifier 104 may detect and extract fiducial point features from the sensor data 102 captured or generated using the sensor(s) 101.

The fiducial point detector and identifier 104 may execute one or more machine learning algorithms, deep neural networks, computer vison algorithms, image processing algorithms, mathematical algorithms, and/or other technologies, to determine whether images of one or more fiducial points are represented by or correspond to the sensor data 102 and/or which portion of the sensor data 102 (or a representation thereof) includes the one or more fiducial points. For example, the fiducial point detector and identifier 104 and/or other components of the calibrator 112, may be implemented using any type of machine learning model or algorithm, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of algorithms or machine learning models.

Figure 2:
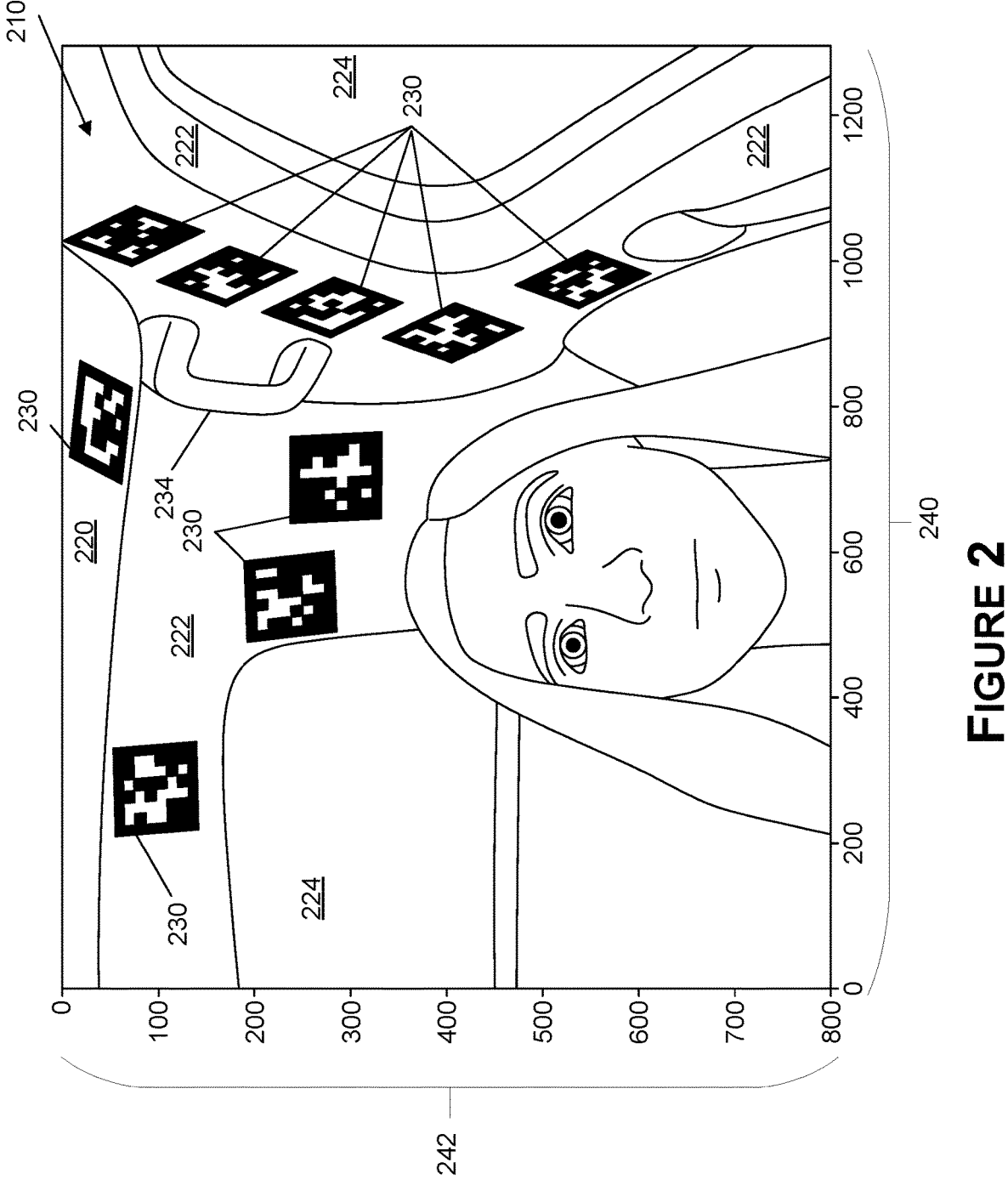
FIG. 2 is an example two-dimensional (2D) image frame depicting fiducial marker points within an interior space of a vehicle or other machine, in accordance with some embodiments of the present disclosure.

Referring now to FIG. 2, FIG. 2 is an example of a 2D image frame 200 from sensor data 102 capturing an interior space of a vehicle interior 210. More specifically, image frame 200 depicts an example view of a vehicle's interior with one or more fiducial points visible within the image frame 200. The fiducial point points may comprise fiducial point markers (such as shown at 230) that are integrated into a surface of the interior roof liner 220, door, back, or side panels 222, windows 224, and/or other fixed surfaces. The fiducial point markers 230 may include visual fiducial system patterns, such as, but not limited to, AprilTag patterns, ARtag patterns, and/or other patterns that facilitate computing precise relative 3D position, orientation, and/or identity of the fiducial point markers with respect to the (e.g., extrinsic and/or intrinsic) parameters of the sensor 101. In some embodiments, textures, infrared coloring, or other technologies may be used to render fiducial point markers 230 that are not readily discernable to the human eye (e.g., invisible), but detectable by the sensor 101.

Fiducial points may also comprise predefined landmark interior features 234 within the field of view of the sensor 101. Landmark interior features 234 may include structural features within the vehicle interior 210 that have fixed invariant positions with respect to the interior space of a vehicle interior 210. In FIG. 2, landmark interior feature 234 is illustrated as a fixed handle, but in some embodiments may include other features such as handles mount points, fasteners, interior lighting components, or other elements within the cabin discernable from sensor data 102 and detectable as a feature by the fiducial point detector and identifier 104. As discussed above, machine learning algorithms or other technologies may be used to detect and extract fiducial point 230 features from images of the interior space captured by the sensor 101.

For a set of one or more of the fiducial points detected by the fiducial point detector and identifier 104 (which may include fiducial point markers 230, landmark interior features 234, and/or combinations of both), the fiducial point 2D coordinate determination function 106 determines a 2D coordinate within the image space of the image frame 200. From image 200, 2D coordinates u, v may be established for a fiducial point 230 based on the location of the fiducial point 230 with respect to the horizontal u-axis 240 and vertical v-axis 242 of the image space. For example, the 2D coordinates of a fiducial point markers 230 may be defined using one or more designated corner points, or a center point, of the fiducial point markers 230. In some embodiments, fiducial point markers 230 may embed within their pattern a notion of orientation from which the fiducial point 2D coordinate determination function 106 may determine what point(s) on the fiducial point markers 230 are used to define their location. In a similar way, where a fiducial point 230 comprises a landmark interior features 234 detected by the fiducial point detector and identifier 104, the fiducial point detector and identifier 104 may also determine an identity of a landmark interior feature 234 and specify which part of that feature as appearing in image frame 220 is used by the fiducial point 2D coordinate determination function 106 to establish the 2D coordinate. For example, the 2D coordinate of a fixed handle or fastener may be defined using a center point of a bounding shape generated around that feature.

For the set of one or more of the fiducial points 230 detected by the fiducial point detector and identifier 104, the calibrator 112 uses the fiducial point 3D coordinate determination function 108 to determine a 3D coordinate with respect to the cabin coordinate system. Fiducial point markers 230 may further include an encoded identifier (such as pattern or code) readable by the sensor 101. Using the encoded identifier, the fiducial point 3D coordinate determination function 108 may reference vehicle geometry 114 to lookup a known 3D coordinate for each fiducial point markers 230 with respect to the cabin coordinate system. The vehicle geometry 114 may include information regarding the structure of the interior of the vehicle or machine interior, for example from Computer Assisted Drawing (CAD) models, or similar models or specifications, used for manufacturing the vehicle or other machine type (e.g., aircraft, water-based vehicle, robot, drone, construction equipment, warehouse vehicle, etc.). For instance, the vehicle geometry 114 may include a three-dimensional coordinate system that is mapped to the interior of the vehicle or machine and may include information such as the 3D coordinates, size, and/or orientation of the fiducial point markers 230 fabricated into the surfaces of the cabin (and/or other interior space of the vehicle or machine) interior space. The fiducial point detector and identifier 104 may read the encoded identifier from a fiducial point marker 230 and look-up the 3D coordinates for that fiducial point from the vehicle geometry 114. In the same way, the fiducial point detector and identifier 104 may detect and extract a feature from the sensor data 102 comprising a landmark interior feature 234, and be trained or program to recognize an identity of that feature, and look-up the 3D coordinates for that fiducial point from the vehicle geometry 114.

As such, for each of the set of one or more of the fiducial points 230 detected by the fiducial point detector and identifier 104, the calibrator 112 determines both a 2D coordinate (u, v) with respect to the image coordinate system, and a 3D coordinate (x, y, z) with respect to the cabin coordinate system. Using the pair of corresponding 2D coordinates (u, v) and 3D coordinates (x, y, z) for one or more of the fiducial points 230 and the sensor intrinsic parameter 110 (e.g., focal length parameters $f_x$ and $f_y$, sensor principal point parameters $u_0$ and $v_0$ and/or optical distortion coefficient $\gamma$), the calibrator 112 may apply transform computation 116, which comprises a pose computation algorithm to compute a rotation-translation transform for sensor 101. For example, transform computation 116 may compute a rotation-translation transform as an RT matrix comprising rotation vector (R) and translation vector (T) as discussed herein with respect to the expression:

$$s \begin{bmatrix} u \\ v \\ 1 \end{bmatrix} = \begin{bmatrix} f_x & \gamma & u_0 \\ 0 & f_y & v_0 \\ 0 & 0 & 1 \end{bmatrix} [R|T] \begin{bmatrix} x \\ y \\ z \\ 1 \end{bmatrix}$$

Although the rotation-translation transform (e.g., RT) may be computed using a single fiducial point's pair of corresponding 2D coordinates and 3D coordinates, greater accuracy may be achieved by optimizing 2D-3D coordinate pairs for a plurality of fiducial points. For example, in some embodiments, the pose computation algorithm applied by transform computation 116 iteratively computes the RT matrix to converge on a set of R and T values that optimally fit the 2D and 3D coordinates of the set of coordinate pairs of the detected fiducial points. In this way, the pose computation algorithm may compute an (e.g., optimized, or having undergone an optimization procedure or operation) translation-rotation matrix corresponding to the extrinsic pose of the sensor 101. The OpenCV algorithm solvePnP is one example of a pose computation algorithm that may be applied by the transform computation 116 to estimate rotation (R) and translation (T) vectors to derive the rotation-translation transform. The occupant monitoring system 118 may, for example, use this rotation-translation transform to generate updated sensor data (e.g., 3D coordinate data) from the 2D sensor data 102 to use as 3D data in the cabin coordinate system as input for one or more operations (such as an input to the DNN(s) 120 or to operate on one or more layers on the DNN(s) 120, for example). In some embodiments, a respective rotation-translation transform (e.g., RT matrix) may be computed using the calibration techniques described herein for individual image capturing sensors used by the occupant monitoring system 118 and stored as a calibration parameter in memory for access by the occupant monitoring system 118 and/or other system.

Figure 3:
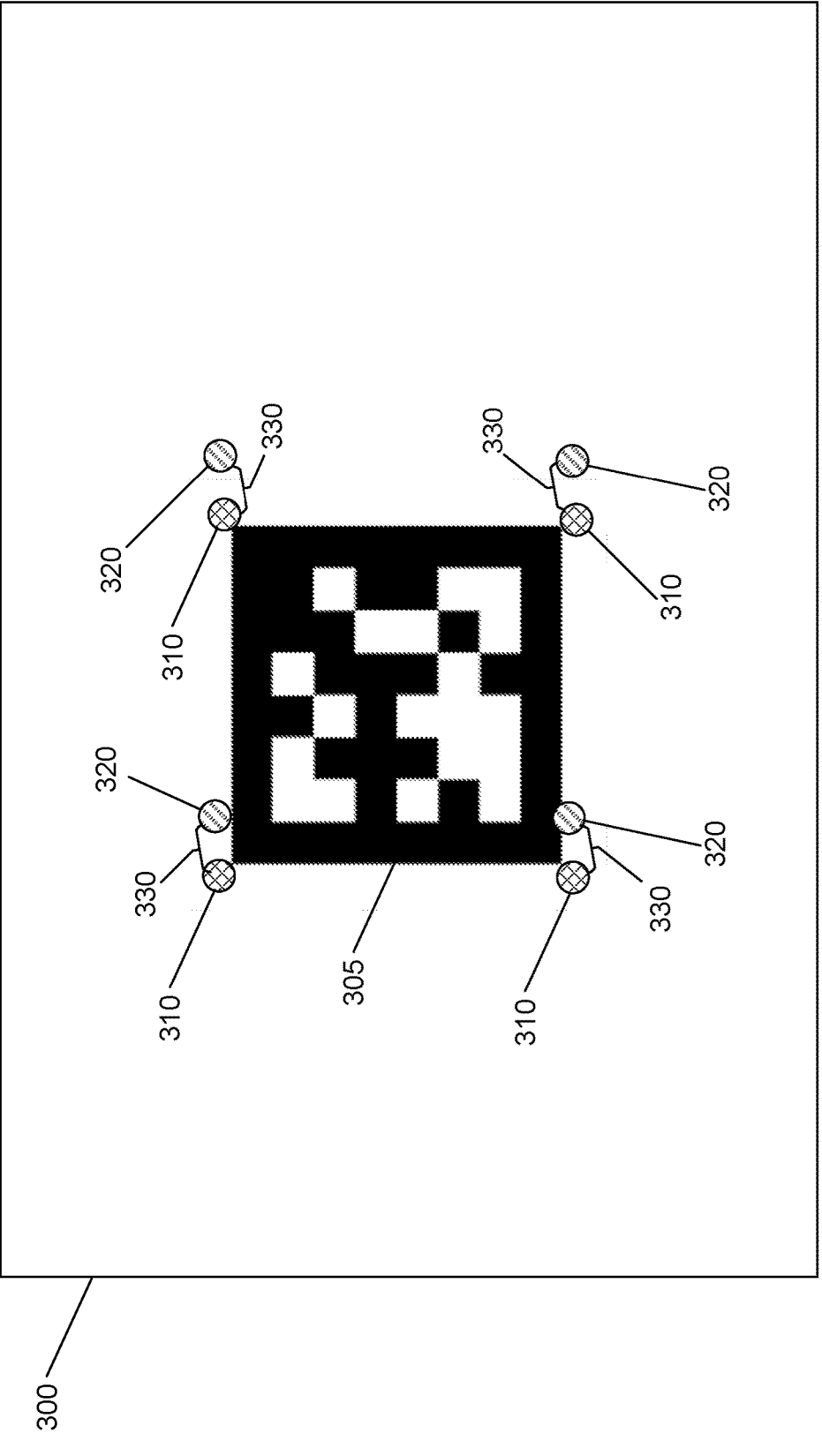
FIG. 3 is an example illustration of re-projecting three-dimensional (3D) coordinates of a fiducial point to determine an accuracy of an estimated rotation-translation transform, in accordance with some embodiments of the present disclosure.

In some embodiments, the accuracy of the estimated rotation-translation transform computed by the calibrator 112 may be determined by re-projecting the known 3D coordinates of one or more fiducial points back onto an image of the fiducial points captured by a sensor 101. For example, referring now to FIG. 3, one or more corners of given fiducial point 305 may define one of more calibration points 310. The ground truth 3D coordinates ($x_i$, $y_i$, $z_i$) for these calibration points 310 of fiducial point 305 may be known coordinates, for example from the vehicle geometry 114. Using an image frame 300 captured by the sensor 101, and the rotation-translation transform computed for that sensor 101 by the calibrator 112, 2D validation points 320 (e.g., corresponding to one of the calibration points 310) may be computed and projected back onto the image frame 300. The 2D coordinates of the computed validation points 320 may be compared to the 2D coordinates of the corresponding calibration points 310 that are derived from the captured image frame 300. The deviations 330 between the coordinates of the validation points 320 and the coordinates of the calibration points 310 captured in the image frame 300 may indicate a calibration error in the rotation-translation transform previously computed by the calibrator 112. In some embodiments, calibration errors computed for a plurality of fiducial points from the captured image frame may similarly be determined and an aggregate calibration accuracy metric computed. In some embodiments, deviations 330 exceeding a threshold value may be used by the calibrator 112 as the basis to trigger a recalibration for the sensor 101 (e.g., a re-computing of the rotation-translation transform). The calibration accuracy metric associated with a sensor 101 may be periodically tracked by calibrator 112 and/or trending metrics computed. The calibrator 112 may respond to adverse metrics that indicate that the sensor 101 pose is changing over time (e.g., as the result of vehicle vibrations) and respond to adverse metrics by setting a vehicle service flag or activating a warning indication. A service technician (e.g., during a vehicle service) may re-execute the sensor calibration described herein to re-compute an RT matrix for one or more of the vehicle's OMS sensors while the vehicle is in the shop for service.

In some embodiments, the calibrator 112 may automatically initiate a runtime sensor calibration while the vehicle or machine 800 remains in service. Initiation of the runtime sensor calibration may be triggered based on adverse calibration accuracy metrics and/or trending metrics (e.g., when the metrics exceed a threshold), triggered periodically (e.g., based on time and/or mileage driven), and/or triggered based on other factors. For example, in some embodiments, a sensor 101 may be mounted within a driver adjustable component (e.g., a steering wheel column). When the driver adjusts the height, tilt, or other position adjustment of the component, the rotation-translation transform previously computed for sensor 101 may no longer be valid. A vehicle system may inform the calibrator 112 of the position adjustment, and the calibrator 112 automatically initiate a runtime calibration for that repositioned sensor to compute a new rotation-translation transform.

Now referring to FIG. 4, FIG. 4 is a flow diagram showing a method 400 for image sensor parameter calibration, in accordance with some embodiments of the present disclosure. It should be understood that the features and elements described herein with respect to the method 400 of FIG. 4 may be used in conjunction with, in combination with, or substituted for elements of, any of the other embodiments discussed herein and vice versa. Further, it should be understood that the functions, structures, and other descriptions of elements for embodiments described in FIG. 4 may apply to like or similarly named or described elements across any of the figures and/or embodiments described herein and vice versa.

Each block of method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the calibrator 112 and occupancy monitoring system 118 of FIG. 1. However, this method may additionally or alternatively be executed by any one system, or any combination of systems, including, but not limited to, those described herein.

The method 400, at block B402, includes determining, based at least on an image of an interior space generated using a sensor, a two-dimensional (2D) image coordinate corresponding to a fiducial point depicted in the image. The first may be obtained as sensor data 102 from any type of optical sensors (e.g., RGB sensors, Infrared sensors (IR), depth sensors, cameras, or other optical sensors, for example) such as but not limited to those described herein with respect to the vehicle 800 and/or other vehicles or objects—such as robotic devices, VR systems, AR systems, mixed reality systems, etc., in some examples. In some embodiments, the first image of the interior space may correspond to sensor data comprising 2D image frames generated using one or more in-cabin sensors, such as sensor 101. The first image may also correspond to sensor data generated using one or more external sensors of the vehicle 800, such as one or more cameras, RADAR sensor(s) 860, ultrasonic sensor(s) 862, LIDAR sensor(s) 864, and/or the like. As such, sensor data 102 may also correspond to sensors with a sensory field or field of view at least partially external to the vehicle 800 (e.g., cameras, LiDAR sensors, etc. with sensory fields including the environment exterior to the vehicle 800). The fiducial points may include marker that comprise visual fiducial system patterns, such as, but not limited to, AprilTag patterns or other patterns that facilitate computing precise 3D position, orientation, and/or identify of the fiducial point markers relative to the sensor. Fiducial points may also comprise predefined landmark interior features within the field of view of the sensor 101 such as handles, seatbelt mount points, interior lighting components, or other discernable elements within the cabin. In some embodiments, one or more fiducial points may be detected from the first image using the fiducial point detector and identifier 104 discuss with respect to FIG. 1. The fiducial point detector and identifier 104 may detect and extract fiducial point features from the first image captured by first sensor. The fiducial point detector and identifier 104 may execute one or more machine learning algorithms, deep neural networks, computer vison algorithms, image processing algorithms, mathematical algorithms, and/or other technologies, to determine whether images of one or more fiducial points exist within sensor data 102 and/or which portion of the first image includes the one or more fiducial points. The fiducial point detector and identifier 104, may be implemented using any type of machine learning model or algorithm, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of algorithms or machine learning models.

For example, from the 2D coordinates u, v may be established for the fiducial point depicted in the image based on the location of the fiducial point as it appears with respect to the horizontal u-axis and vertical v-axis of the image space. The 2D coordinates of a fiducial point markers may be defined using one or more designated corner points, or a center point, of the fiducial point markers. Where a fiducial point 230 comprises a detected landmark interior feature, the fiducial point detector and identifier 104 may determine an identity of the landmark interior feature and specify which part of that feature as appearing in first frame is used to establish a 2D coordinate. For example, the 2D coordinate of a fixed handle or fastener may be defined using a center point of a bounding box generated around that feature.

The method 400, at block B404, includes determining a three-dimensional (3D) coordinate corresponding to a location of the fiducial point within the interior space. In some embodiments, a three-dimensional coordinate may be determined with respect to the interior space for the fiducial point. The fiducial point may include, for example, an encoded identifier (such as pattern or code) readable by the first sensor. Using the encoded identifier, a 3D coordinate determination can be made, for example by reference to vehicle geometry 114 to lookup a known 3D coordinate for the fiducial point markers with respect to the cabin coordinate system. Similarly, for a fiducial point comprising a landmark interior feature, a machine learning model or other algorithm may be trained or programmed to recognize an identity of that feature, and look-up the 3D coordinates for that fiducial point from the vehicle geometry 114.

The method 400, at block B406, includes computing a transform between the 2D image coordinate and the 3D coordinate, and at block B408, includes determining, based at least on the transform, a value of a calibration parameter corresponding to the sensor. For example, a calibration parameter for the first sensor may be determined based at least on computing a rotation-translation transform from the two-dimensional image coordinate for the fiducial point and the three-dimensional coordinate with respect to the interior space for the fiducial point. Using the pair of corresponding 2D coordinates (u, v) and 3D coordinates (x, y, z) for one or more fiducial points, and sensor intrinsic parameters for the first sensor (e.g., focal length parameters $f_x$ and $f_y$, sensor principal point parameters $u_0$ and $v_0$ and/or optical distortion coefficient γ), the calibrator 112 may apply transform computation 116, which comprises a pose computation algo-rithm to compute a rotation-translation transform for the first sensor. For example, transform computation 116 may compute a rotation-translation transform as an RT matrix comprising rotation vector (R) and translation vector (T) as discussed above. The OpenCV algorithm solvePnP is one example of a pose computation algorithm that may be applied by the transform computation 116 to estimate rotation (R) and translation (T) vectors to derive the rotation-translation transform.

The method 400, at block B410, includes configuring, based at least on the value of the calibration parameter, an operation corresponding to the sensor. In some embodiments, the value of the calibration parameter may be stored as a calibration parameter in memory for access by the occupant monitoring system 118 or other system. The occupant monitoring system 118 may, for example, use the rotation-translation transform to generate updated sensor data (e.g., 3D coordinate data) as an input to the DNN(s) 120 or to operate on one or more layers on the DNN(s) 120. As an example, the operation of the occupant monitoring system 118 may be configured using the first calibration parameter to predict from sensor data 102 a gaze location of occupant(s) within the cabin coordinate system corresponding to the interior of the vehicle 800, wherein other systems of vehicle 800 may determine one or more operations to perform based on the gaze prediction, and/or other tasks or operations. The occupant monitoring system 118 is thus calibrated to account for the intrinsic and extrinsic calibration parameters of the first sensor that captures the first image.

Assessment of a vehicle occupant's eye gaze is an example of an operation that may be executed by the occupant monitoring system 118. With the rotation-translation transform computed for the sensor 101, features in images captured by the sensor 101 may be converted using the rotation-translation transform to the 3D coordinate cabin coordinate system, and used by the occupant monitoring system 118, for example, to evaluate a driver's eye gaze to determine what instrument cluster, controls, window, and/or other gaze region of the cabin interior the driver is currently observing. The DNN(s) 120, for example, may be trained to determine a gaze direction from sensor data 102 and project a predicted gaze direction to a gaze point on the cabin interior, and determine a coordinate in the cabin coordinate system corresponding to that gaze point. In some embodiments, the gaze direction or region, or other occupant related information, may be used in conjunction with a conversational artificial intelligence (AI) agent or bot, such as a digital avatar or chat bot. For example, the information about where the occupant is looking and/or what the occupant is doing may be used as context for one or more machine learning models or deep neural networks associated with the agent, avatar, or bot, in addition to speech or text information, to determine an intent or desire of an occupant(s). For example, if a user says "open that window," while looking at the front passenger window, this text and the context of where the user is looking may aid the bot or agent in generating a proper command to lower the front passenger window.

Figure 5:
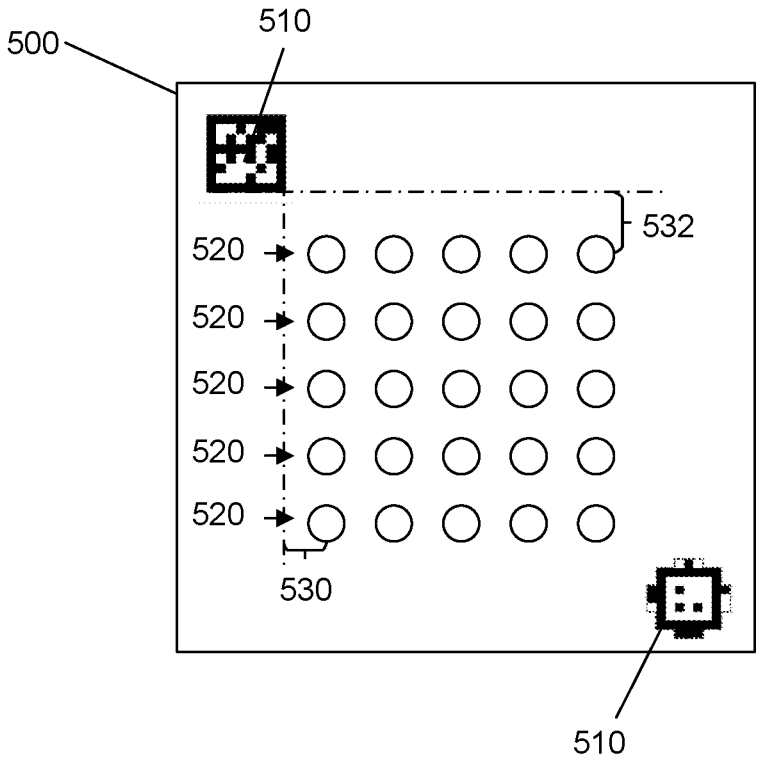
FIG. 5 is an example illustration of a ground truth data collection tool, in accordance with some embodiments of the present disclosure.

FIG. 5 is an illustration of an example ground truth data collection tool 500 that may be placed in the field of view of one or more OMS sensors, such as sensor 101, that have been calibrated to the cabin coordinate system. In some implementations, a ground truth data collection tool 500 may be placed outside of the field of view of the OMS sensors, and a mirror or other reflective surface may be used to reflect an image of the ground truth data collection tool

500 into one or more of the OMS sensors' field of view. As shown in FIG. 5, the ground truth data collection tool 500 may comprise one or more fiducial point markers 510, and one or more driver gaze targets 520. In some embodiments, the driver gaze targets 520 comprise illuminating devices, such as light emitting diodes for example, that may be selectively illuminated to capture the attention of a test driver and cause the test driver to gaze at the illuminated driver gaze target. In some implementations, a plurality of ground truth data collection tools 500 may be positioned within the internal space of the cabin at designated gaze region locations. A rotation-translation transform for a ground truth data collection tool 500 may be obtained by capturing an image of the ground truth data collection tool 500 using the previously calibrated sensor 101 (e.g., having a previously determined rotation-translation transform calibration parameter). The features of the fiducial point markers 510 may be detected (e.g., by the fiducial point detector and identifying 104) and the 2D coordinates (u, v) of the fiducial point markers 510 determined from the captured image frame as discussed above. With respect to determining the 3D coordinate (x, y, z) of the fiducial point markers 510, the ground truth data collection tool 500 may be placed at a designated gaze region having known 3D coordinates in the cabin coordinate system (e.g., based on vehicle geometry 114) so that the 3D coordinates of the fiducial point markers 510 are also known. Given these 2D and 3D coordinate parameters for the fiducial point markers 510, the transform computation 116 may execute a pose computation algorithm such as discussed above (e.g., the OpenCV algorithm solve-PnP) to compute a rotation-translation matrix that defines a rotation-translation transform describing the pose of the ground truth data collection tool 500 with respect to the cabin coordinate system. Moreover, the horizontal offset 530 and vertical offset 532 between the fiducial point markers 510 and the one or more driver gaze targets 520, as well as the respective horizontal and vertical distances between each of the driver gaze targets 520, are known constants from the construction of the ground truth data collection tool 500 so that the 3D coordinates with respect to the cabin coordinate system for each of the driver gaze targets 520 are therefore readily computed, for example as a function of their offset from one of fiducial point markers 510 and the established pose of the ground truth data collection tool 500.

Figure 6:
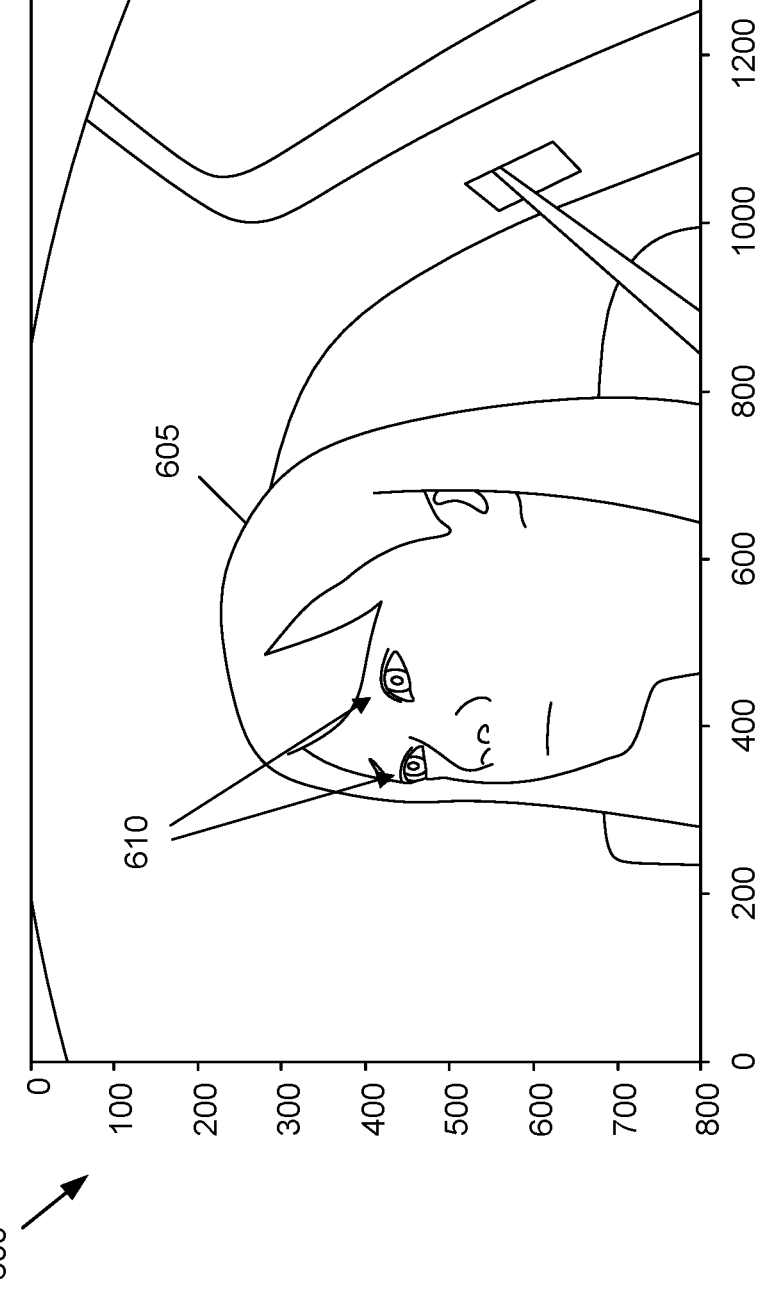
FIG. 6 is example visualization of an image and corresponding ground truth gaze data, in accordance with some embodiments of the present disclosure.

With the positions of the gaze targets calibrated to the cabin coordinate system, images for ground truth gaze data, such as shown at 600 in FIG. 6, may be generated using sensor 101 by capturing images of test driver eye gaze as the gaze targets are selectively activated. For example, a test operator may illuminate a first of the gaze targets 520 on the ground truth data collection tool 500 while sensor 101 captures images of a test driver 605 seated in the driver's seat. The illumination of the first gaze target will catch the test driver's attention as image frames such as image frame 600 capture the test driver's eyes 610 as their gaze is directed at the illuminated gaze target. Because the 3D coordinates of the illuminated gaze target with respect to the cabin coordinate system is known, and the sensor 101 rotation translation with respect to the cabin coordinate system is computed by calibrator 112, the 3D coordinates of the illuminated gaze target with respect to the sensor 101 coordinate system may be derived. Image frame 600 may be labeled with the 3D coordinates of the first gaze target in sensor 101 coordinate system to produce ground truth data corresponding to the training image (for example, for training DNN(s) 120 or other machine learning model of the occupant monitoring system 118). Additional ground truth data for any number of training images may be generated in the same manner by illuminating other gaze targets either on the same ground truth data collection tool 500 or other instances of the ground truth data collection tool 500 to produce a set of training data by sequentially illuminating the other gaze targets while image frames capture the driver's eye and gaze direction. Moreover, given the first rotation-translation matrix (R1, T1) derived for the sensor 101, and the second rotation-translation matrix (R2, T2) describing the relative pose between the gaze region and one or more of the fiducial points 230, (e.g., computable from vehicle geometry 114) the sensor 101's pose in terms of rotation R and translation T with respect to the gaze region may be computed as $R=R2*(R1)^{-1}$ and $T=T2-T2$.

Now referring to FIG. 7, FIG. 7 is a flow diagram showing a method 700 for generating ground truth gaze data, in accordance with some embodiments of the present disclosure. It should be understood that the features and elements described herein with respect to the method 700 of FIG. 7 may be used in conjunction with, in combination with, or substituted for elements of, any of the other embodiments discussed herein and vice versa. Further, it should be understood that the functions, structures, and other descriptions of elements for embodiments described in FIG. 7 may apply to like or similarly named or described elements across any of the figures and/or embodiments described herein and vice versa.

Each block of method 700, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 700 is described, by way of example, with respect to the calibrator 112 and occupancy monitoring system 118 of FIG. 1. However, this method may additionally or alternatively be executed by any one system, or any combination of systems, including, but not limited to, those described herein.

The method 700, at block B702, includes detecting one or more fiducial points using an image of a ground truth data collection tool comprising one or more driver gaze targets, the image captured by a sensor. For example, the sensor 101 may capture sensor data 102 comprising an image of a ground truth data collection tool such as shown in FIG. 5. The ground truth data collection tool 500 thus may include one or more fiducial point markers 510, and one or more driver gaze targets 520 that comprise illuminating devices, such as light emitting diodes. The sensor may be calibrated to the 3D cabin coordinate system using a rotation-translation transform computed for the sensor by the calibrator 112, so that features in images captured by the sensor 101 may be converted to the 3D coordinate cabin coordinate system.

The method 700, at block B704, includes determining a two-dimensional image coordinate for a fiducial point of the one or more fiducial points using the image. The features of the fiducial point markers 510 may be detected using the fiducial point detector and identifier 104, and the 2D coordinates (u, v) of the detected fiducial point markers 510 determined from the captured image frame as discussed above.

The method 700, at block B706, includes determining a rotation-translation transform for the ground truth data collection tool from the two-dimensional image coordinate for the fiducial point and a three-dimensional coordinate with respect to the interior space for the fiducial point. For example, the ground truth data collection tool 500 may be placed at a designated gaze region having known 3D coordinates in the cabin coordinate system, which may be determined from the vehicle geometry 114. The three-dimensional coordinate for the fiducial point may thus be established based on the 3D coordinates of the designated gaze region where the ground truth data collection tool 500 is placed. The transform computation 116 may execute a pose computation algorithm (e.g., the OpenCV algorithm solvePnP) using these 2D and 3D coordinate parameters to compute the rotation-translation matrix. The resulting rotation-translation transform describes the pose of the ground truth data collection tool with respect to the sensor 101 coordinate system. The sensor may be calibrated to the 3D cabin coordinate system using a rotation-translation transform computed for the sensor by the calibrator 112, thus the pose of the ground truth data collection tool can be converted to cabin coordinate system.

The method 700, at block B708, includes determining a second three-dimensional coordinate with respect to the interior space for a driver gaze target of the one or more driver gaze targets based at least on a first calibration parameter for the first sensor and the rotation-translation transform for the ground truth data collection tool. The three-dimensional coordinate for the driver (or other occupant) gaze target may be computed as a function of offsets from the fiducial point to the gaze target. These offsets may be may be fixed dimensions known from the construction of the ground truth data collection tool. Block B708 may be repeated for individual gaze targets of the one or more driver gaze targets on the ground truth data collection tool, and the method 700 repeated for a plurality of ground truth data collection tools placed at a plurality of designated gaze regions within the vehicle interior. With the positions of the gaze targets from the one or more ground truth data collection tools calibrated to the cabin coordinate system, ground truth gaze data may be generated by capturing images of test driver eye gaze as the gaze targets are selectively activated, as discussed herein at least with respect to FIGS. 5 and 6.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 8A:
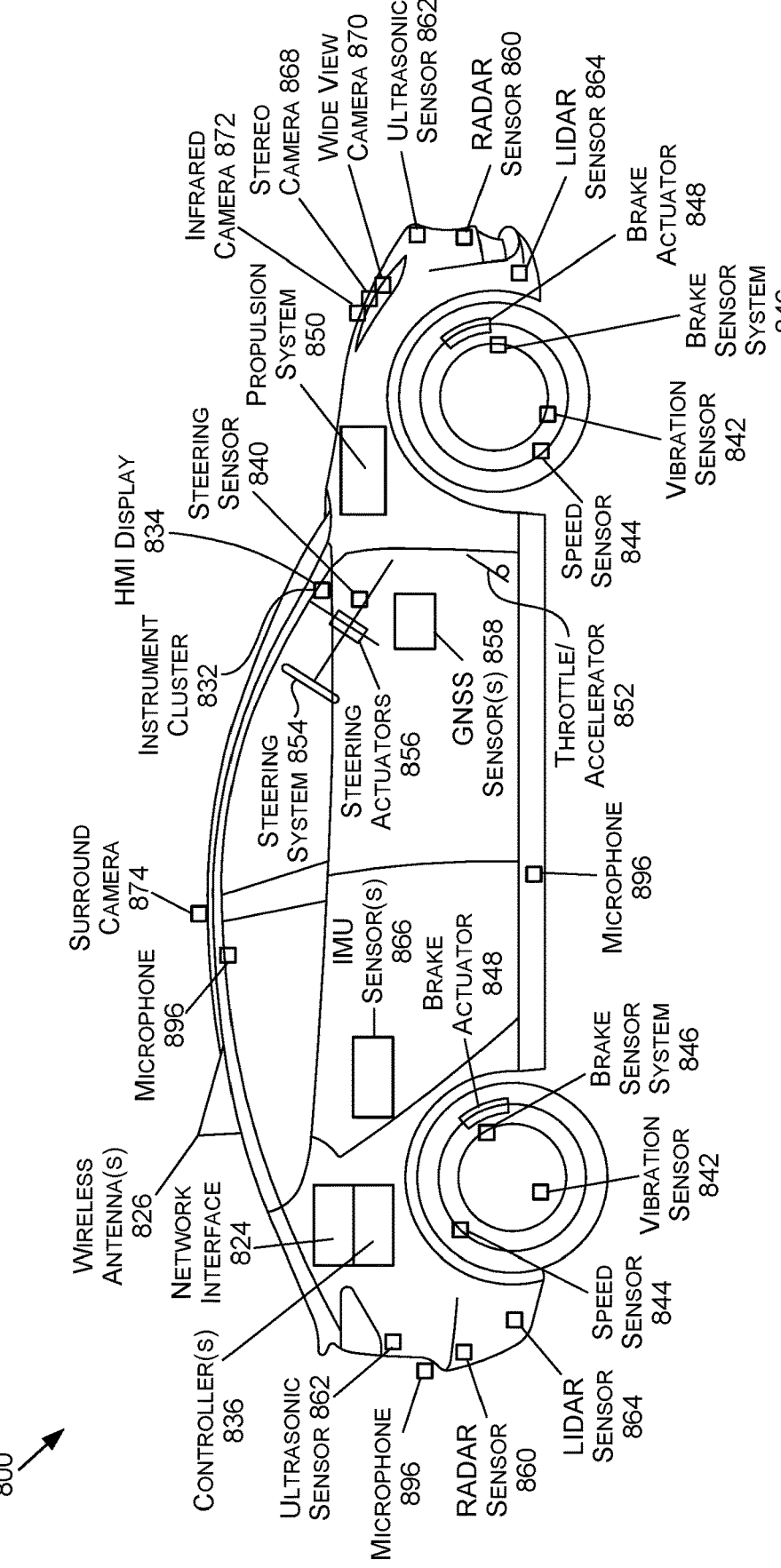
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems ("GNSS") sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the High Definition ("HD") map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 826 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 8B:
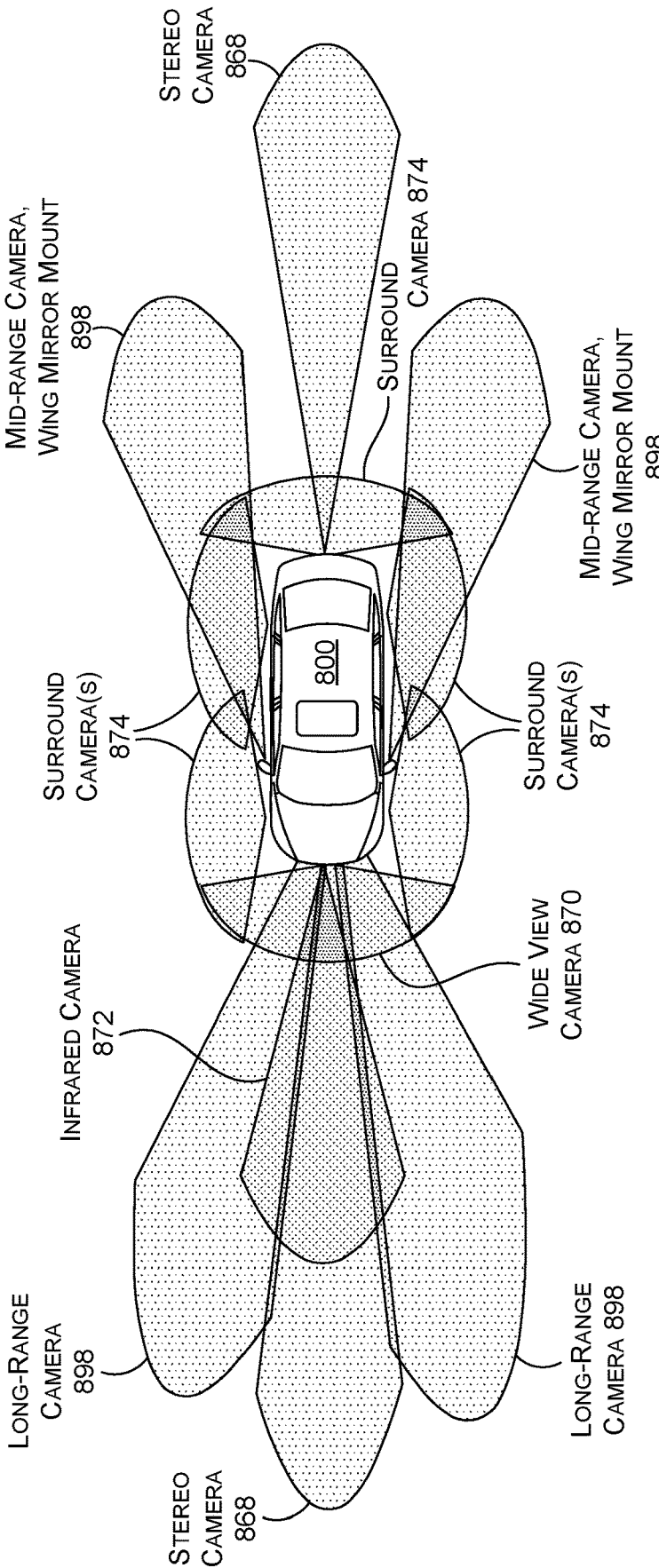
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may be any number (including zero) of wide-view cameras 870 on the vehicle 800. In addition, any number of long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

Any number of stereo cameras 868 may also be included in a front-facing configuration. In at least one embodiment, one or more of stereo camera(s) 868 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
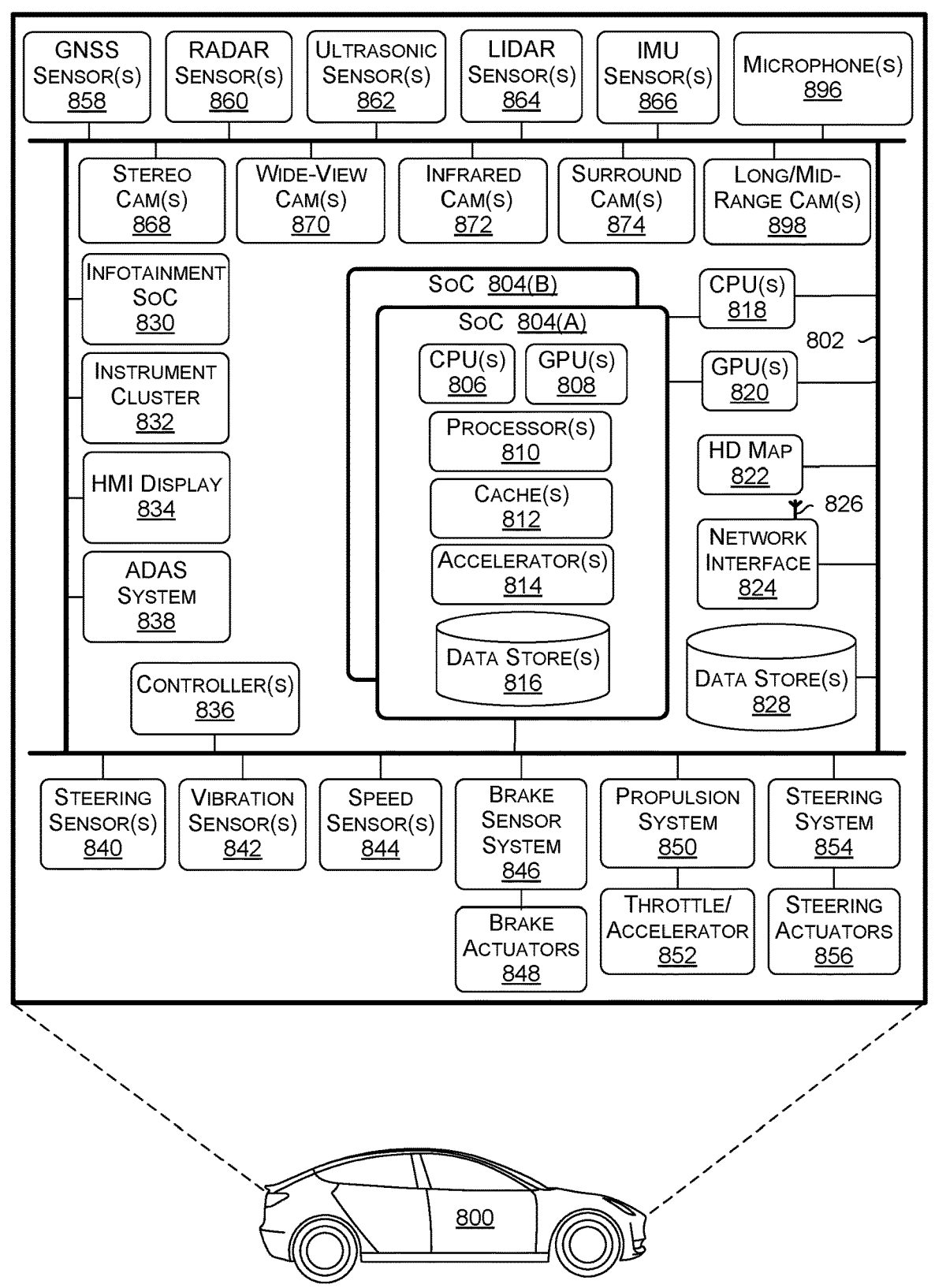
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D). In some embodiments, functions of the calibrator 112 and/or the occupant monitoring system 118 described herein may be implemented at least in part by an SoC 804.

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g., from another subsystem), inertial measurement unit (IMU)

sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)).

Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
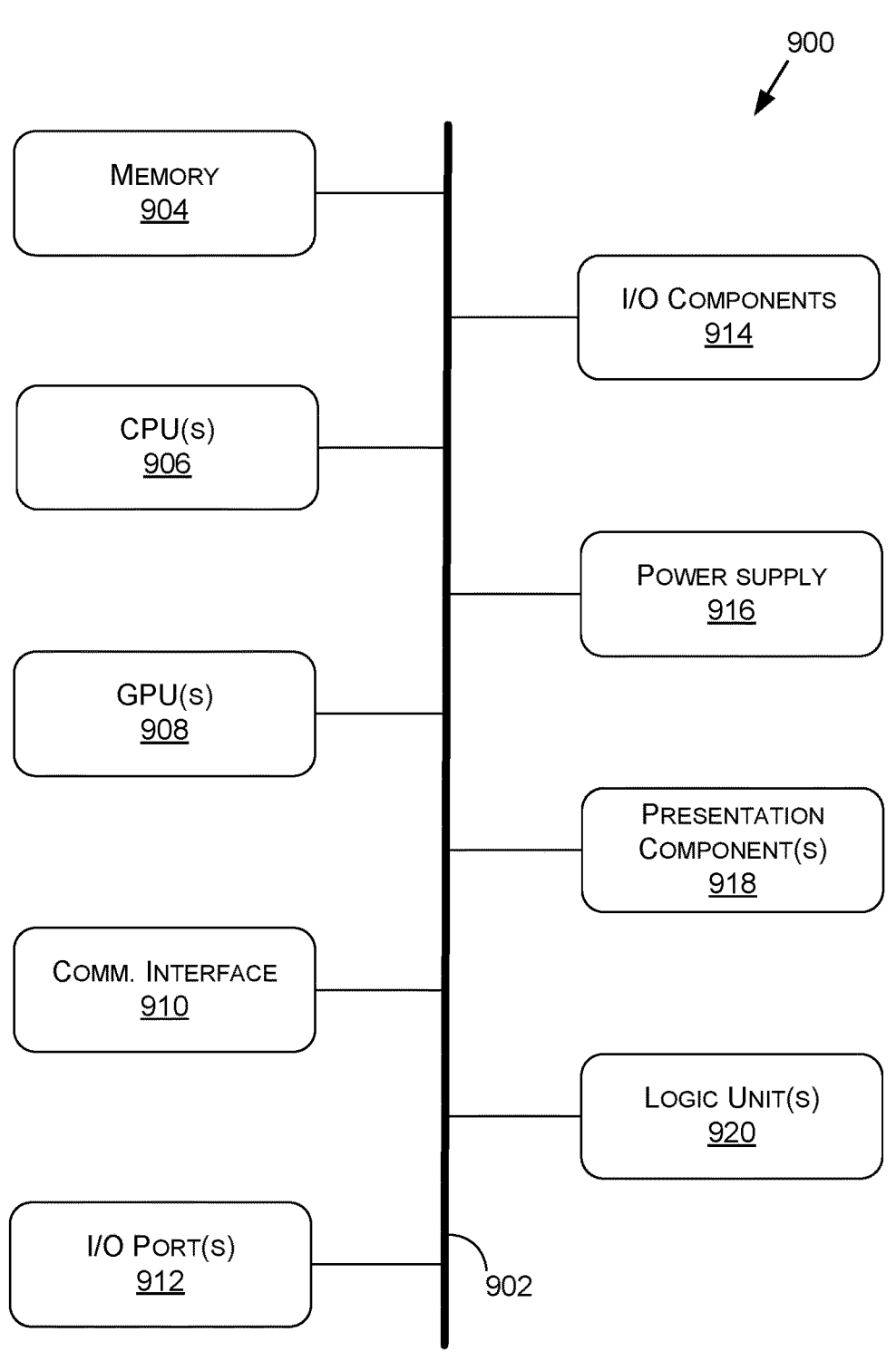
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs. In some embodiments, one or more functions of the calibrator 112 and/or occupant monitoring system 118 may be implemented using one or more of the CPU(s) 906 and/or the GPU(s) 908.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
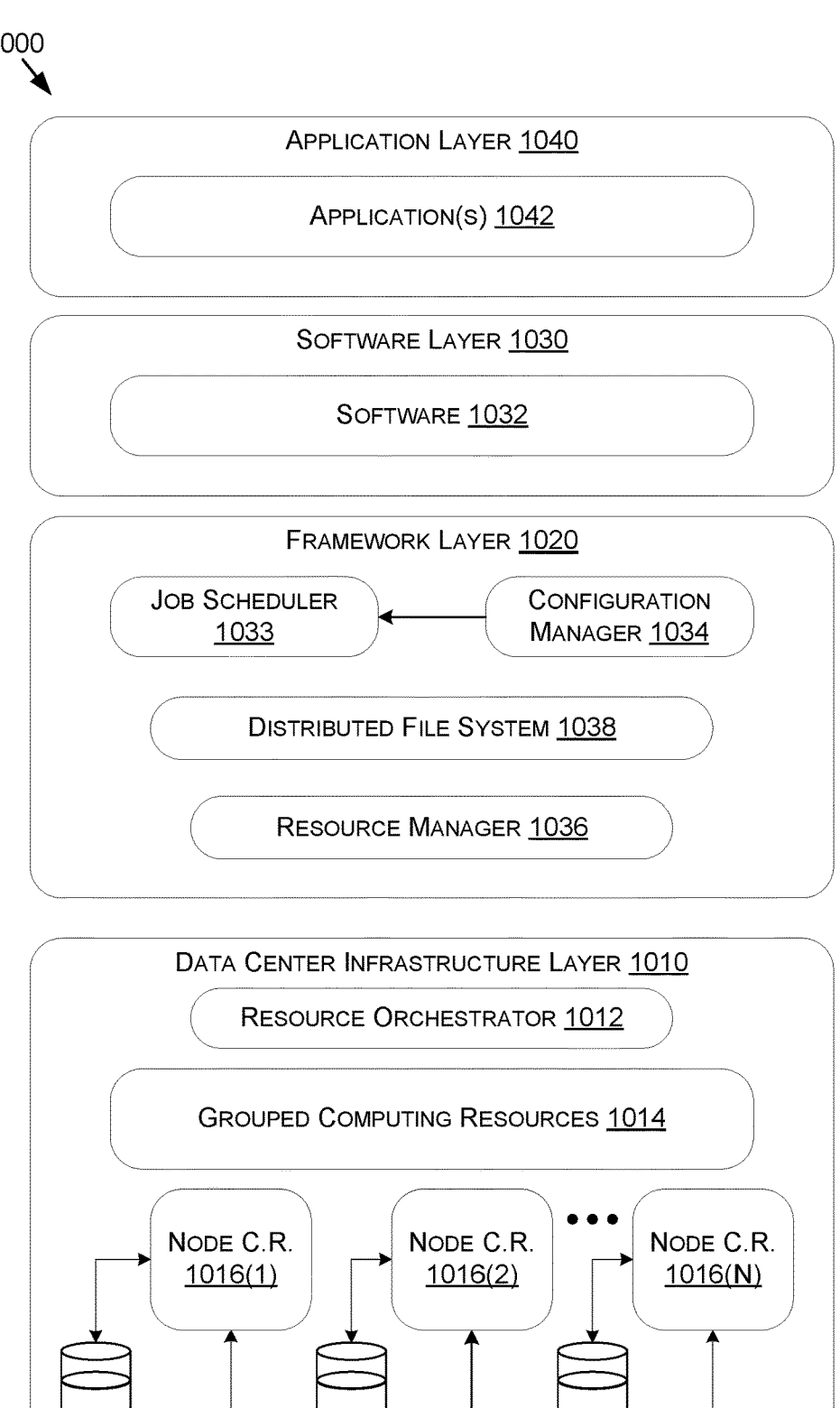
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field program-mable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodi-ments, one or more node C.R.s from among node C.R.s 1016(1)-1016(N) may correspond to a server having one or more of the above-mentioned computing resources. In addi-tion, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM). In some embodiments, one or more func-tions of the calibrator 112 and/or occupant monitoring system 118 may be implemented using one or more of the node C.R.s 1016(1)-1016(N).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or other-wise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, frame-work layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or appli-cation(s) 1042 may respectively include web-based service software or applications, such as those provided by Amazon Web Services, Google Cloud and Microsoft Azure. The framework layer 1020 may be, but is not limited to, a type of free and open-source software web application frame-work such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and dis-tributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastruc-ture layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped comput-ing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cogni-tive compute, and a machine learning application, including training or inferencing software, machine learning frame-work software (e.g., PyTorch, TensorFlow, Caffe, etc.), and/or other machine learning applications used in conjunc-tion with one or more embodiments.

In at least one embodiment, any of configuration manager 1034, resource manager 1036, and resource orchestrator 1012 may implement any number and type of self-modify-ing actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, soft-ware or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image rec-ognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:

one or more processing units to:

determine, based at least on an image of an interior space of a machine generated using a sensor affixed to a portion of the interior space of the machine, a two-dimensional (2D) image coordinate corresponding to a fiducial point depicted in the image, the fiducial point being positioned within the interior space of the machine at an invariant location with respect to the interior space of the machine;

determine a three-dimensional (3D) coordinate in a coordinate system of the interior space of the machine corresponding to the invariant location of the fiducial point within the interior space of the machine;

compute a transform between the 2D image coordinate and the 3D coordinate in the coordinate system of the interior space of the machine;

determine, based at least on the transform, a value of a calibration parameter corresponding to the sensor;

configure, based at least on the value of the calibration parameter, an operation corresponding to the sensor; and initiate a recalibration of the sensor using the fiducial point based at least on one or more triggers.

2. The system of claim 1, wherein the one or more processing units are further to:

compute the transform from a set of one or more coordinate pairs that include the 2D image coordinate and the 3D coordinate corresponding to the fiducial point and a second 2D image coordinate and a second 3D coordinate corresponding to at least a second fiducial point depicted in the image.

3. The system of claim 1, wherein the fiducial point corresponds to at least one of:

a fiducial point marker integrated with a fixed surface of the interior space of the machine; or a fixed interior feature integrated with the fixed surface of the interior space of the machine.

4. The system of claim 1, wherein the sensor comprises a camera or an optical sensor.

5. The system of claim 1, wherein the one or more processing units are further to:

detect the fiducial point based at least on the image using one or more of: a computer vision algorithm, a deep neural network, or a machine learning algorithm.

6. The system of claim 1, wherein the one or more processing units are further to:

determine the 3D coordinate based at least on pre-determined 3D coordinates for the fiducial point stored in memory.

7. The system of claim 1, wherein the one or more processing units are further to:

determine the 3D coordinate based at least on information encoded to the fiducial point or a fiducial point marker corresponding to the fiducial point.

8. The system of claim 1, wherein the one or more processing units are further to:

compute a calibration accuracy metric for the calibration parameter based at least on re-projecting the 3D coordinate corresponding to the fiducial point into the image or another image of the fiducial point using the value of the calibration parameter.

9. The system of claim 1, wherein the one or more processing units are further to:

determine a position of at least one moveable object within the interior space of the machine based at least on a second image generated using the sensor, wherein the second image is generated based at least on the value of the calibration parameter.

10. The system of claim 1, wherein the one or more processing units are further to:

detect a second fiducial point using a second image of the interior space of the machine generated using a second sensor;

determine, based at least on the second image, a second 2D image coordinate corresponding to the second fiducial point;

determine a second 3D coordinate corresponding to a second location of the second fiducial point within the interior space of the machine;

determine a second value of the calibration parameter for the second sensor based at least on computing a second transform based at least on the second 2D image coordinate and the second 3D coordinate; and translate a first image space of the sensor to a second image space of the second sensor based at least on the value of the calibration parameter and the second value of the calibration parameter.

11. The system of claim 1, wherein the one or more processing units are further to:

detect a second fiducial point based at least on a second image associated with a ground truth data collection tool comprising one or more gaze targets;

determine, based at least on the second image, a second 2D image coordinate corresponding to the second fiducial point;

determine a second transform corresponding to the ground truth data collection tool based at least on the second 2D image coordinate and a second 3D coordinate corresponding to a second location of the second fiducial point within the interior space of the machine; and determine a third 3D coordinate corresponding to a third location within the interior space of the machine associated with a gaze target of the one or more gaze targets based at least on the value of the calibration parameter and the second transform corresponding to the ground truth data collection tool.

12. The system of claim 1, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for generating or presenting at least one of virtual reality content, augmented reality content, or mixed reality content;

a system for performing deep learning operations;

a system for performing real-time streaming;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

13. The system of claim 1, wherein the recalibration comprises determining a second value of the calibration parameter corresponding to the sensor based at least on a second transform between a second 2D image coordinate corresponding to the fiducial point depicted in a second image of the interior space of the machine generated using the sensor and the 3D coordinate in the coordinate system of the interior space of the machine.

14. The system of claim 1, wherein the one or more processing units are further to:

determine a second 2D image coordinate corresponding to the fiducial point depicted in a second image of the interior space of the machine generated using the sensor;

determine a validation point in the second image based at least on the 3D coordinate in the coordinate system of the interior space of the machine and the transform;

determine a calibration accuracy metric based at least on a deviation between the second 2D image coordinate and the validation point; and generate a first trigger of the one or more triggers based at least on the calibration accuracy metric.

15. A processor comprising:

one or more processing units to:

determine a two-dimensional (2D) image coordinate corresponding to a fiducial point detected using an image of an interior space of a machine captured using a sensor affixed to a portion of the interior space of the machine, the fiducial point being positioned within the interior space of the machine at an invariant location with respect to the interior space of the machine;

determine a three-dimensional (3D) coordinate in a coordinate system of the interior space of the machine corresponding to the invariant location of the fiducial point within the interior space of the machine;

determine a transform corresponding to an extrinsic pose of the sensor based at least on the 2D image coordinate and the 3D coordinate in the coordinate system of the interior space of the machine;

store a value of a calibration parameter corresponding to the sensor based at least on the transform; and initiate a recalibration of the sensor using the fiducial point based at least on one or more triggers.

16. The processor of claim 15, wherein the one or more processing units are further to:

detect the fiducial point using one or more of: a computer vision algorithm or a machine learning algorithm.

17. The processor of claim 15, wherein the one or more processing units are further to:

determine the 3D coordinate based at least on one or more pre-determined coordinates corresponding to the fiducial point that are stored in memory.

18. The processor of claim 15, wherein the one or more processing units are further to:

determine the 3D coordinate based at least on encoded information represented using the fiducial point or a fiducial point marker corresponding to the fiducial point.

19. The processor of claim 15, wherein the one or more processing units are further to:

determine a position of at least one moveable object within the interior space of the machine based at least on a second image generated using the sensor, the second image generated based at least on the value of the calibration parameter.

20. The processor of claim 15, wherein the transform includes a rotation-translation transform indicating a relationship between the 2D image coordinate and the 3D coordinate.

21. The processor of claim 15, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing real-time streaming;

a system for generating or presenting at least one of virtual reality content, augmented reality content, or mixed reality content;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

22. A method comprising:

determining information corresponding to an occupant of a machine based at least on a first image generated using a sensor affixed to a portion of an interior space of the machine, the sensor being calibrated based at least on computing a transform between a two-dimensional image coordinate corresponding to a depiction of a fiducial marker in a second image generated using the sensor and a three-dimensional coordinate in a coordinate system of the interior space of the machine corresponding to a known invariant location of the fiducial marker in the interior space of the machine; and initiating a recalibration of the sensor using the fiducial marker based at least on one or more triggers.

\* \* \* \* \*